US006556981B2

(12) United States Patent
Pedersen et al.

(10) Patent No.: US 6,556,981 B2
(45) Date of Patent: Apr. 29, 2003

(54) FIRE DETECTION SYSTEMS AND METHODS

(76) Inventors: Robert D. Pedersen, 7808 Glen Eagle, Dallas, TX (US) 75248; Jerome H. Lemelson, Unit 802, Suite 286, 930 Tahoe Blvd., Incline Village, NV (US) 89451-9436

( * ) Notice: Subject to any disclaimer, the term of this patent is extended or adjusted under 35 U.S.C. 154(b) by 75 days.

(21) Appl. No.: 09/911,064

(22) Filed: Jul. 23, 2001

(65) Prior Publication Data

US 2002/0026431 A1 Feb. 28, 2002

Related U.S. Application Data

(63) Continuation of application No. 09/184,181, filed on Nov. 2, 1998, now Pat. No. 6,289,331, which is a continuation of application No. 08/552,810, filed on Nov. 3, 1995, now Pat. No. 5,832,187.

(51) Int. Cl.[7] .......................... G06F 15/00; G06F 17/00
(52) U.S. Cl. .......................... 706/44; 706/60; 706/913
(58) Field of Search .......................... 706/44, 60, 913

(56) References Cited

U.S. PATENT DOCUMENTS

| 5,182,566 A | 1/1993 | Ferguson et al. | 342/357 |
| 5,187,805 A | 2/1993 | Bertiger et al. | 455/430 |
| 5,193,064 A | 3/1993 | Maki | 701/221 |
| 5,202,829 A | 4/1993 | Geier | 701/215 |
| 5,214,757 A | 5/1993 | Mauney et al. | 345/331 |
| 5,220,876 A | 6/1993 | Monson et al. | 111/130 |
| 5,223,844 A | 6/1993 | Mansell et al. | 342/357 |
| 5,225,842 A | 7/1993 | Brown et al. | 342/357 |
| 5,228,854 A | 7/1993 | Eldridge | 434/11 |
| 5,243,652 A | 9/1993 | Teare et al. | 380/21 |
| 5,247,440 A | 9/1993 | Capurka et al. | 701/49 |
| 5,260,709 A | 11/1993 | Nowakowski | 342/62 |
| 5,270,936 A | 12/1993 | Fukushima et al. | 701/213 |

(List continued on next page.)

OTHER PUBLICATIONS

Carpenter, G.A. and Grossberg, S., *Neural Networks for Vision and Image Processing*, MIT Press, Cambridge, Massachusetts, 1992, p. 54 & 230.

Clarke, Bill, *Aviator's Guide to GPS*, TAB Books, 1994; p. 54 & 230.

Gershon, N. and Miller, C., "Dealing with the Data Deluge," IEEE Spectrum, Jul. 1993, p. 28–32.

Hammerstrom, D., "Working with Neural Networks," IEEE Spectrum, Jul. 1993, p. 46–53.

Hice, C. & Young, D.; "Real Time Image Analysis and Visualization from Remote Vide for Fire and Resource Management," Advance Imagery, May 1995, at p. 30–32.

McNeill, Daniel, *Fuzzy Logic*, Simon & Schuster, New York (1993) at p. 268–310 ISBN0-671-73843-7.

(List continued on next page.)

Primary Examiner—George B. Davis
(74) Attorney, Agent, or Firm—Douglas W. Rudy

(57) ABSTRACT

A method for detecting fires and reacting thereto. A stationary, earth orbit satellite, drone aircrafts or piloted aircraft contains infrared detectors and optical means for detecting fires. A computer in the satellite, drone or piloted aircraft and/or on the ground analyzes image signals of the areas being monitored and, upon detecting infrared radiation of varying intensity and shape, indicative that a fire has started, generates signals which are indicative of the coordinate locations of the fire, the extent of the fire, the shape of the area(s) burning, the direction of movement of the fires, the speed(s) of the flame fronts, smoke condition, intensity of the fire, fire ball location(s), etc. In one form, a camera generates image signals which are digitized and recorded. Expert system logic is used to prioritize dangerous areas to assist in directing fire fighting. Information is transmitted to earth bound and/or aircraft contained receivers where fire fighting equipment is available for immediate dispatch to the fire zone.

16 Claims, 18 Drawing Sheets

U.S. PATENT DOCUMENTS

| | | | |
|---|---|---|---|
| 5,323,322 A | 6/1994 | Mueller et al. | 701/215 |
| 5,334,987 A | 8/1994 | Teach | 342/357 |
| 5,345,244 A | 9/1994 | Gildea et al. | 342/357 |
| 5,355,140 A | 10/1994 | Slavin et al. | 342/386 |
| 5,359,332 A | 10/1994 | Allison et al. | 342/357 |
| 5,361,212 A | 11/1994 | Class et al. | 701/16 |
| 5,367,306 A | 11/1994 | Hollon et al. | 342/386 |
| 5,379,224 A | 1/1995 | Brown et al. | 701/215 |
| 5,381,338 A | 1/1995 | Wysocki et al. | 701/207 |
| 5,382,958 A | 1/1995 | FitzGerald | 342/386 |
| 5,389,934 A | 2/1995 | Kass | 342/357 |
| 5,390,125 A | 2/1995 | Sennot et al. | 701/214 |
| 5,392,052 A | 2/1995 | Eberwine | 342/357 |
| 5,396,254 A | 3/1995 | Toshiyuki | 342/357 |
| 5,396,540 A | 3/1995 | Gooch | 455/456 |
| 5,408,238 A | 4/1995 | Smith | 342/357 |
| 5,412,573 A | 5/1995 | Barnea et al. | 701/211 |
| 5,414,432 A | 5/1995 | Penny, Jr. et al. | 342/257 |
| 5,418,537 A | 5/1995 | Bird | 342/357 |
| 5,420,795 A | 5/1995 | Greene | 701/200 |
| 5,422,813 A | 6/1995 | Schuchman et al. | 701/214 |
| 5,422,816 A | 6/1995 | Sprague et al. | 701/213 |
| 5,430,656 A | 7/1995 | Dekel et al. | 701/213 |
| 5,434,787 A | 7/1995 | Okamoto et al. | 701/214 |
| 5,438,817 A | 8/1995 | Nakamura | 56/10.2 A |
| 5,445,453 A | 8/1995 | Prelat | 374/23 |
| 5,519,809 A | 5/1996 | Husseiny et al. | 704/275 |
| 5,832,187 A | 11/1998 | Pedersen et al. | 706/45 |
| 5,983,161 A | 11/1999 | Lemelson et al. | 701/301 |
| 6,084,510 A | 7/2000 | Lemelson et al. | 340/539 |

OTHER PUBLICATIONS

Perry, T., "Modeling the World's Climate," IEEE Spectrum, Jul. 1993, at p. 33–42.

Smith, James M.; "Forest Service Collects Weather Data 'Where the Fires Are'," Government Computer News, Feb. 7, 1994, vol. 13, No. 3, p. 50.

Zorpette, G., "Sensing Climate Change," IEEE Spectrum, Jul. 1993, p. 20–27.

WIND = NONE

| C/D | VC | C | M | F | VF |
|---|---|---|---|---|---|
| VL | M | L | VL | VL | VL |
| L | H | M | L | VL | VL |
| N | VH | H | M | L | VL |
| H | VH | H | M | M | L |
| VH | VH | H | M | M | M |

WIND = LOW

| C/D | VC | C | M | F | VF |
|---|---|---|---|---|---|
| VL | H | M | L | VL | VL |
| L | VH | H | M | L | VL |
| N | VH | H | M | M | L |
| H | VH | VH | H | M | M |
| VH | VH | VH | H | H | M |

WIND = MODERATE

| C/D | VC | C | M | F | VF |
|---|---|---|---|---|---|
| VL | VH | H | M | L | VL |
| L | VH | H | M | M | L |
| N | VH | H | H | M | M |
| H | VH | VH | H | H | M |
| VH | VH | VH | VH | H | H |

WIND = HIGH

| C/D | VC | C | M | F | VF |
|---|---|---|---|---|---|
| VL | VH | H | H | M | L |
| L | VH | H | H | M | M |
| N | VH | VH | H | H | H |
| H | VH | VH | VH | H | H |
| VH | VH | VH | VH | VH | H |

FIG. 11

FIG. 11A $$\text{DANGER INDEX MATRIX} = D = \begin{bmatrix} D_{11} & D_{12} & D_{13} & D_{14} & D_{15} \\ D_{21} & D_{22} & D_{23} & & D_{25} \\ D_{31} & D_{32} & & & D_{35} \\ \circ & & & & \circ \\ \circ & & & & \circ \\ \circ & & & & \circ \\ \circ & & & & \circ \\ D_{81} & \circ & \circ & \circ & \end{bmatrix}$$

FIG. 12

$$\text{VALUE MATRIX} = V = \begin{bmatrix} V_{11} & V_{12} & V_{13} & \circ & \circ & V_{18} \\ V_{21} & V_{22} & V_{23} & \circ & \circ & V_{28} \\ V_{31} & V_{32} & & & & V_{38} \\ \circ & & & & & \circ \\ V_{51} & \circ & \circ & \circ & & \end{bmatrix}$$

FIG. 13

$$\text{SECTOR PRIORITY VECTOR} = \begin{bmatrix} S_1 & S_2 & S_3 & S_4 & S_5 & S_6 & S_7 \\ V_1 & V_2 & V_3 & V_4 & V_5 & V_6 & V_7 \end{bmatrix}$$

$$P_1 = \overline{V}_1 \bullet \overline{D}_1 = \sum_{i=1}^{5} V_{1i} \bullet D_{1i}$$

$$\text{AREA PRIORITY MATRIX} = \begin{bmatrix} P_{11} & P_{12} & \cdots & P_{18} \\ P_{21} & P_{22} & \cdots & P_{28} \\ \circ & & & \circ \\ \circ & & & \circ \\ \circ & & & \circ \\ \circ & & & \circ \\ \circ & & & \circ \\ P_{N1} & \circ & \circ & \circ & P_{NM} \end{bmatrix}$$

FIG. 18

$$\text{FIRE ADJACENT NODE PRIORITY MATRIX} = \begin{bmatrix} AP_{11} & AP_{12} & \cdots & AP_{18} \\ AP_{21} & AP_{22} & \cdots & AP_{28} \\ \circ & & & \circ \\ \circ & & & \circ \\ \circ & & & \circ \\ \circ & & & \circ \\ \circ & & & \circ \\ AP_{2M} & \circ & \circ & \circ \end{bmatrix}$$

$$\text{WHERE} \quad AP_{ij} = \sum_{\substack{l=i-1 \\ m=j-1}}^{\substack{l=i+1 \\ m=j+1}} P_{lm}$$

FIG. 19

FIRE DETECTION SYSTEMS AND METHODS

This is a continuation of application Ser. No. 09/184,181, filed Nov. 2, 1998, Pat. No. 6,289,331, which is a continuation of application Ser. No. 08/552,810, filed Nov. 3, 1995, U.S. Pat. No. 5,832,187.

BACKGROUND

These inventions relate to the field of fire fighting systems and methods, and more specifically, to comprehensive fire fighting systems and methods that automatically optimize fire fighting activities by integrating image acquisition and analysis, expert systems using fuzzy logic rule-based decision making, satellite positioning and tracking systems and advanced communication methods.

Fires frequently result in significant disasters that cause loss of personal property and human life. The failure to timely detect fires and optimally control fire fighting activities causes the unnecessary loss of considerable natural resources. Proper management of fires is complicated by the large and remote areas in which the fires often occur, the difficulty in detecting the fires at early stages, and problems associated with efficient dispatching and tracking of fire fighting equipment and crews. The Western United States, for example, is particularly vulnerable to destruction by fire, due to its wide expanses of open forest areas in mountainous terrains and its frequently dry condition. In addition, weather conditions such as high winds contribute to the rapid spread of fires, resulting in the destruction of large areas.

Fire fighters have adopted several modern technologies to assist in the coordination of fire fighting activities. For example, the use of two way radios enables fire fighters to remain in close communication while coordinating fire fighting efforts. Helicopters and aircraft frequently assist in the attempt to contain fire damage by dropping water or other fire fighting agents on portions of the fire. More recently, efforts were reported that use airborne video cameras to monitor areas of a fire and that provide real-time video imaging signals to assist fire fighters in assessing the extent and location of fires. Positioning systems such as GPS (Global Positioning System) have also been suggested for use in data logging images of fires, fire perimeters, dozer lines, boundaries, etc. see "Real Time Image Analysis And Visualization From Remote Video For Fire And Resource Management," Advanced Imagery, May 1994, at pp. 30–32, incorporated herein by reference.

The efforts described above represent important advances in fire fighting technology. However, they do not take full advantage of modern expert computer systems, satellite positioning technology and communication methods. Importantly, prior fire fighting systems and methods fail to quickly detect fires, and to optimize and organize the entire fire fighting effort. The need exists for fire fighting systems and methods that take advantage of modern computer imaging and global positioning technology, coupled with expert system decision logic (e.g., fuzzy logic), to assist in quickly detecting fires and organizing and optimizing the overall fire fighting effort.

OBJECTS OF THE INVENTION

It is an object of this invention to provide new and improved fire fighting systems and methods that integrate expert system computer technology, image analysis, modern communication and networking operations, and precise global positioning technology to optimize fire fighting activities.

It is another object of this invention to provide coordinated fire fighting systems and methods that detect and specifically locate fires using satellite, airborne and fixed-mount reconnaissance of selected geographic areas.

It is another object of this invention to provide coordinated fire fighting systems and methods using remote control pilotless drone reconnaissance.

It is another object of this invention to provide coordinated fire fighting systems and methods using expert systems implemented with fuzzy logic rules.

It is another object of this invention to automatically optimize fire fighting activities using fuzzy logic analysis of numerous pertinent fire control factors, such as specific characteristics about the fire, surrounding geography, inhabitants or population near the fire, weather, and the availability and known location of the fire fighting resources.

It is another object of this invention is to optimize fire fighting activities by continuously tracking and monitoring the location of fire fighting resources.

It is another object of this invention is to optimize fire fighting activities by continuously tracking and monitoring changing fire or weather conditions.

It is another object of this invention to track fire fighting resources using modern locating systems such as Global Positioning System or the Global Orbiting Navigational System (GLONASS).

It is another object of this invention assist fire fighters in prioritizing areas in which to concentrate fire fighting resources, including, for example, by considering fire control factors such as weather, terrain, population, property value, and the availability and location of known fire fighting resources, and further, to optimize and adjust fire fighting priorities on a real time basis as conditions change.

It is another object of this invention to consider danger to persons or particularly valuable properties or resources in prioritizing fire fighting decisions.

It is another object of this invention to continually acquire and update data defining the fire and the location of fire fighting resources as conditions change to optimize fire fighting activities.

SUMMARY OF INVENTION

The above and other objects are achieved in the present invention, which provides totally integrated fire detection systems and methods that use advanced computer, satellite positioning, and communication systems to quickly analyze a large amount of data to detect a fire and optimize an overall fire fighting effort.

The integrated fire detection and fighting systems and methods of the present invention use earth satellites, piloted and drone aircraft and fixed mount cameras to periodically generate and capture images of selected geographic regions. The video images are computer analyzed to detect and precisely locate a fire at its earliest stages. Computer image analysis is used to fully characterize the fire, such as identifying its extent, intensity, flame fronts and rate of growth, etc. Expert system computers based on fuzzy logic rules analyze all known variables important to determining a fire fighting strategy. For example, the characteristics of the fire, the characteristics of the region burning (i.e, its terrain, the existence of natural fire barriers, its combustibility, value, population, etc.), actual and predicted weather conditions, and the availability, type and location of fire fighting resources are all analyzed in accordance with optimized fuzzy logic rules. The results of the fuzzy logic analysis it of all available fire control factors are used to optimize fire fighting decisions, and to update detailed graphics displays.

The integrated fire detection and fighting systems and methods of the present invention use advanced image gathering and expert system analysis to continuously update and optimize fire fighting decisions as conditions change. Continuously during the fire fighting efforts, images of the fire and surrounding terrain are obtained and communicated to image analysis computers. The image analysis computers evaluate the image data, and other pertinent characteristics, to maintain a fully updated database that characterizes critical aspects of the ongoing fire. Advanced weather gathering tools update weather conditions pertinent to or likely to impact the fire, and communicate that data to the fire control center. The fire control center uses advanced satellite positioning and associated communication systems to continuously monitor the precise location of all deployed and available fire fighting resources. The fire control center includes an expert system that uses fuzzy logic rules to continuously evaluate the updated characteristics of the fire, weather, and terrain, along with the location and type of available fire fighting resources, to continuously optimize fire fighting decisions. A graphics monitor is continuously updated to indicate the location and characteristics of the fire, the location and status of all fire fighting resources, the existence of actual or potential danger areas, and the identity of any high priority situations.

The integrated fire detection and fighting systems and methods of the present invention use advanced satellite locating systems that track fire fighting resources to speed deployment and rescue operations. During the fire fighting activities, a fire control center obtains via GPS or other satellite positioning systems the precise location of all fire fighting resources. An expert system at the fire control center monitors the actual position and movement of the fire fighting resources relative to prior decisions and the determined characteristics of the actual fire to identify potential or actual danger situations. As each potentially dangerous situation is identified, the expert system issues an alarm. The expert system evaluates the known location and type of available fire fighting resources, and recommends or automatically initiates optimal rescue operations.

Applicant describes below in the Figures and Specification the preferred embodiments of his inventions, as defined in the appended claims. It is applicant's intention that, unless specifically noted, the words and phrases set forth below and in the claims are to be given their ordinary, accustomed and meaning to those of ordinary skill in the pertinent art. In that regard, in this application, several concepts from different arts are combined in an integrated system, and accordingly, the individual pertinent arts should be consulted.

Moreover, if the specification or claims recite language as a means or steps for performing a function, unless otherwise noted, it is applicant's intention that his inventions be construed to include the use of any and all structures, materials or acts that are capable of performing the recited function, including not only the particular structure, material or acts shown in the specification, but also any known or later-developed structure, material or acts that can perform that function, plus any known or later-developed equivalents thereto. Unless otherwise noted, it is not applicant's intent that any element of any claim be limited to only the specific structure, material or act for performing a stated or related function.

For example, generic video and infrared scanners are shown and referenced throughout the specification. It is intended that any appropriate imaging system, conventional scanner, special scanner (such as a laser scanner), camera or optical system can be substituted, as long as it can generate image data that can ultimately be used by a computer to detect the presence of a fire. Likewise, radio links are shown throughout the specification as one of the preferred forms of a communication link. However, any appropriate communication link can be substituted. Further, while the Global Positioning System (GPS) is described as the preferred locating and tracking system, any existing or later-developed locating system (such as GLONASS, radar, etc.), whether satellite based or not, can be substituted. Other examples exist throughout the disclosure, and is not applicant's intention to exclude from the scope of his invention the use of structures, materials or acts that are not expressly identified in the specification, but nonetheless capable of performing expressed functions.

BRIEF DESCRIPTION OF DRAWINGS

The inventions of this application are better understood in conjunction with the following drawings and detailed description of the preferred embodiments. The various hardware and software system elements used to carry out the invention are illustrated in the form of block diagrams, flow charts, neural network and fuzzy logic algorithms and structures in the attached drawings.

FIG. 11 illustrates representative fuzzy logic inference rules useful in an expert system implementation of the invention. Again, numerous other inference rules can be added or substituted for those shown in FIG. 11.

FIG. 11A illustrates several additional fuzzy logic inference rules that include a specific parameter reflecting the rate of spread of the fire.

FIG. 12 illustrates a representative danger index matrix useful in setting priorities for specific areas according to their respective degrees of danger.

FIG. 13 illustrates a representative value matrix useful in setting priorities for optimally fighting a spreading fire.

FIG. 18 illustrates a representative priority matrix for the respective areas of the rectangular fire control grid of FIG. 15.

FIG. 19 illustrates an adjacent node priority matrix useful in calculating fire fighting priorities.

The above Figures are better understood in connection with the following detailed description of the preferred embodiments of the inventions.

DETAILED DESCRIPTION

Figure 1:
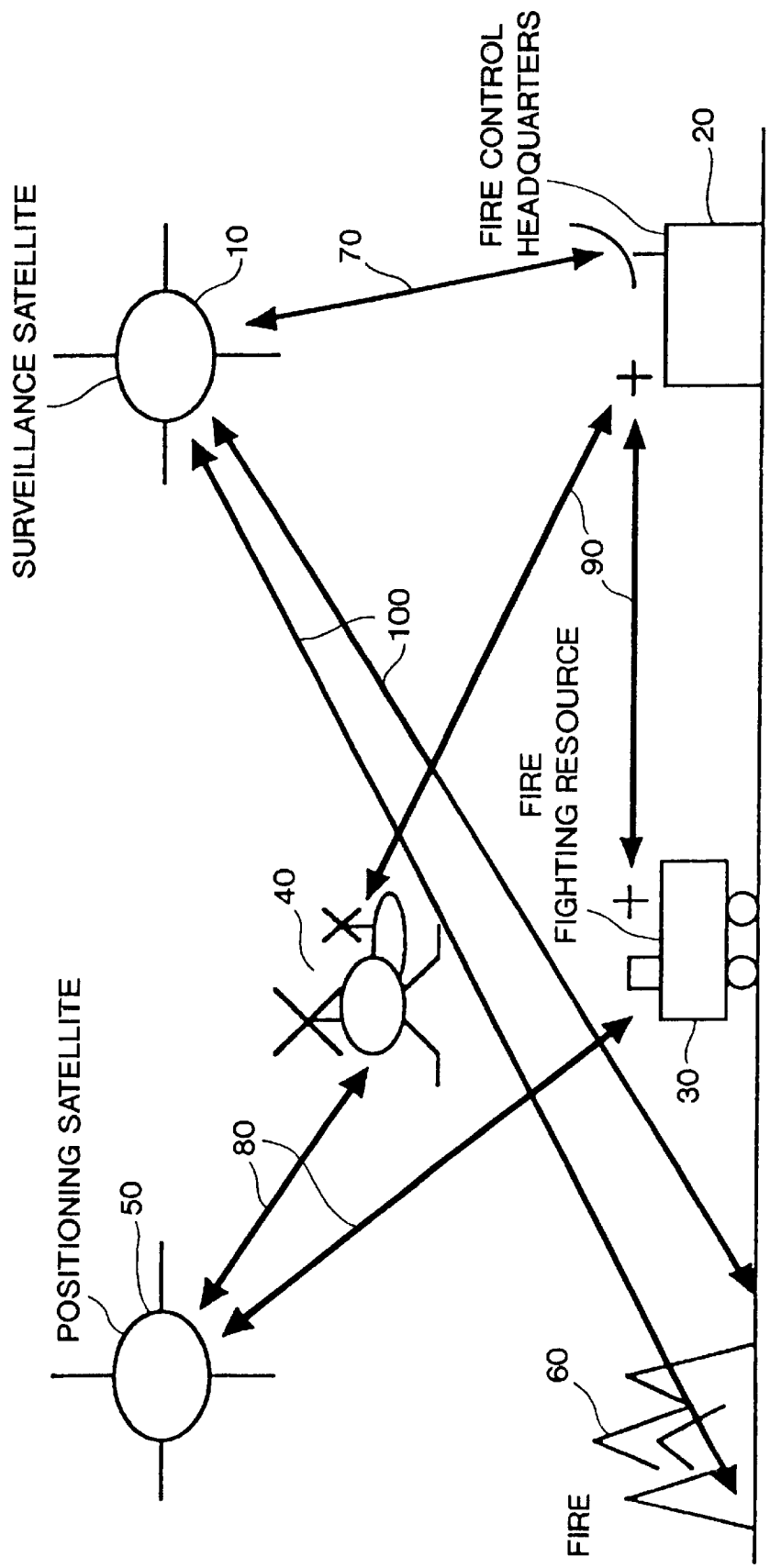
FIG. 1 provides a general system-level diagram of one form of the present invention, illustrating the use of surveillance satellites for location and fire monitoring, a fire control center, fire fighting resources and the fire to be detected and fought.

FIG. 1 provides an overview of a first embodiment of the fire detection and fighting systems and methods of the present invention. A fire monitoring or surveillance satellite 10 scans or otherwise obtains images of selected areas of the earth (not shown) using well known scanning, imaging, video or infrared detection equipment. The scanned areas are typically selected by one or more fire control headquarters 20 on the earth. The areas that are scanned or otherwise imaged are preferably areas of high priority, where the use of fires is generally prohibited or closely restricted. In its simplest form, the scanned areas include large forests, plains, parks, mountain ranges, or other areas where fire represents a particularly dangerous situation. In more complex forms of the invention, the imaged areas can include urban or residential areas, although the imaging and fire detection operations become more difficult.

The surveillance satellite 10 communicates with the fire control headquarters 20 over conventional radio and other data communication links 70. In a preferred form, the fire control headquarters 20 remotely controls a dedicated fire surveillance satellite 10 to continuously scan or image particular areas of the earth for potential fires, represented by the graphic 60 in FIG. 1. In addition, the surveillance satellite 10 is controlled to continuously scan or image existing fires 60, and to communicate further data to fire control headquarters 20 to use in optimizing ongoing fire fighting activities, as described in more detail below. Any conventional data or control communication link 70 can be used to communicate between the surveillance satellite 10 and the fire control headquarters 20. Moreover, the surveillance satellite 10 may be any appropriate satellite imaging system, including shared resource satellites, such as the many existing military and weather surveillance satellites that can be programmed to periodically capture and obtain images for use by the fire control headquarters 20.

Figure 1A:
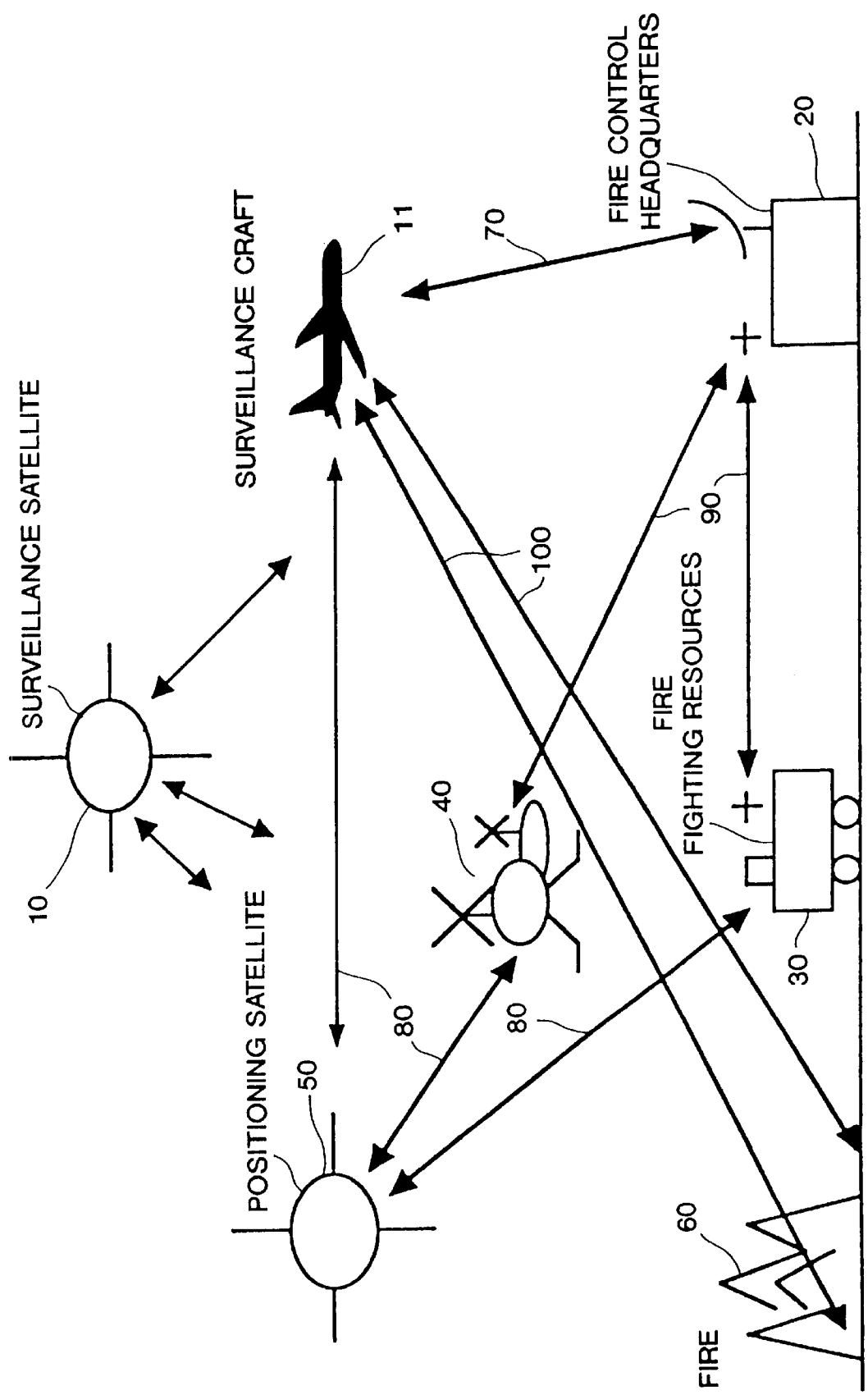
FIG. 1A is an overall system-level diagram similar to FIG. 1, but using a surveillance craft such as an aircraft, or a pilotless drone, for fire surveillance. As mentioned above, although an aircraft or pilotless drone is shown in FIG. 1A, any applicable structure, material or act for conducting aerial surveillance can be substituted, such as tethered balloons, helicopters, remote controlled rockets, etc.

As shown in FIG. 1A, in place of or in addition to the surveillance satellite 10, other surveillance craft 11 such as piloted aircraft, drone aircraft, or tethered balloons (represented collectively in FIG. 1A by the airplane 11) are configured to carry conventional video or infrared imaging equipment to monitor the selected geographic regions. In this embodiment, as images are generated, an advanced geographic positioning system, such as the Global Positioning System (GPS) 50, is used to compute and transmit to the fire control headquarters 20 the precise location of the surveillance craft 11 as images are generated. In that manner, the computer system at the fire control headquarters 20 precisely determines and monitors the location(s) of fires as they start and spread or recede. As in FIG. 1, any conventional communication link 70 can be used to transmit control information and data between the surveillance craft 11 and the fire control headquarters 20. Moreover, while the well known GPS system is preferred for providing the geophysical tracking, other positioning systems, such as the Global Orbiting Navigational System (GLONASS) or radar, can be substituted.

The fire control headquarters 20 uses available advanced image analysis tools to evaluate the data from the fire surveillance satellite 10 and/or surveillance craft 11. The computer image analysis is carried out to detect the presence of a fire 60, and to determine the accurate location of the fire 60 in terms of longitude and latitude coordinates. In a less preferred, but still functional, form of the invention, the image data can be analyzed off site, for example, at leased supercomputing facilities (not shown), and the image analysis results transmitted to the fire control headquarters 20. Likewise, the surveillance satellite 10 and surveillance craft 11 may include the required image processing tools, at which point only the results of the image analysis are transmitted to the fire control headquarters 20.

The advanced video and infrared imaging and analysis techniques applicable to this aspect of the invention are well known, and as a result, are not described here. Several applicable remote sensing and related computer analysis systems and methods are described in the *IEEE Spectrum* (July 1993), particularly, in the articles beginning at pages 20, 28, 33 and 46, and in the article "Real Time Image Analysis and Visualization From Remote Video For Fire and Resource Management," *Advanced Imaging* (May 1995), at pp. 30–32, and in U.S. Pat. No. 5,445,453, each of which is incorporated herein by reference.

The computing systems and methods at the fire control headquarters 20 preferably employ expert systems using fuzzy logic reasoning to analyze the image data received from the surveillance satellite 10 or surveillance craft 11, or from an off-site supercomputing facility (not shown), and to derive optimum fire fighting strategies. Those strategies are based on many factors, including in its preferred form, on (1) the determined characteristics of the fire, (2) preprogrammed information characterizing the geographic area in the vicinity of the fire, (3) actual and predicted weather conditions, and (4) the availability, location and type of fire fighting resources.

In general, expert systems using fuzzy logic inference rules are well known, as described in the following publications, each of which is incorporated herein by reference: Gottwald, Siegried, *Fuzzy Sets and Fuzzy Logic: The Foundations of Application—from a Mathematical Point Of View*, Vieweg & Sohn, Braunschweig Wiesbaden (1993), ISBN 3-528-05311-9; McNeill, Daniel, *Fuzzy Logic*, Simon & Schuster, New York (1993), ISBN 0-671-73843-7; Marks, Robert J. II, *Fuzzy Logic Technology and Applications*, IEEE Technology Update Series (1994), ISBN 0-78031383-6, IEEE Catalog No. 94CR0101-6; Bosacchi, Bruno and Bezdek, James C, *Applications of Fuzzy Logic Technology*, Sept. 8–10, 1993, Boston, Mass., sponsored and published by the SPIE—The International Society for Optical Engineering, SPIE No. 2061, ISBN 0-8194-1326-7.

Preferred fuzzy logic rules applicable to this invention derive optimal fire fighting strategies based not only on real time image analysis and pre-programmed area information, but also on the availability and known location of fire fighting resources such as fire fighting trucks 30, aircraft 40, and associated personnel (not shown). Thus, the fire control headquarters 20 also uses known GPS technology to monitor, track and communicate with all personnel and equipment 30, 40 available to fight a fire. Various configurations of GPS-based tracking and communication systems and methods are described in the following documents, each of which is incorporated herein by reference: Logsdon, Tom, *The Naystar Global Positioning System*, Van Nostrand Reinhold, New York (1992), ISBN 0-422-01040-0; Leick, Alfred, *GPS Satellite Surveying*, John Wiley & Sons, New York (1990), ISBN 0-471-81990-5; Hurn, Jeff, *GPS—A Guide to the Next Utility*, Trimble Navigation, Ltd., Sunnyvale, Calif. (1989); Hurn, Jeff, *Differential GPS Explained*, Trimble Navigation, Ltd., Sunnyvale, Calif. (1993); and U.S. Pat. Nos: 5,434,787; 5,430,656; 5,422,816; 5,422,813; 5,414,432; 5,408,238; 5,396,540; 5,390,125; 5,389,934; 5,382,958; 5,379,224; 5,359,332; 5,418,537; 5,345,244; 5,323,322; 5,243,652; 5,225,842; 5,223,844; 5,202,829; 5,187,805; and 5,182;566. In less preferred, but still applicable, forms of the invention, conventional radar or other positioning systems and methods can be substituted to locate and track the fire fighting resources 30, 40.

Thus, in addition to receiving the image data from the satellite 10 and surveillance craft 11, the computer system at the fire control headquarters 20 also receives the GPS location data from each of the fire fighting resources 30, 40. In a preferred mode, the control headquarters 20 automatically receives the GPS data from each of the fire fighting resources 30, 40 over regular, programmed periods of time. Alternatively, the control headquarters 20 periodically polls each fire fighting resource 30, 40 over communication links 90, and instruct those resources to transmit their respective GPS data. In either manner, current and precise location data is obtained for all available fire fighting resources 30, 40, and is used in the fuzzy logic expert systems at the fire control headquarters 20 to assist in optimizing the fire fighting efforts. Conventional radio, data and control communication links 90 exist between the fire control headquarters 20 and the fire fighting resources 30, 40.

When the location of all fire fighting resources 30, 40 is tracked as described, then the fire control headquarters 20 can optimize fire fighting activities by: (a) automatically computer analyzing the characteristics of the fire and the area burning, along with the known location of all fire fighting resources; (b) automatically and efficiently directing the closest or most effective fire fighting resource to specific high priority locations in or beyond the fire zone; and (c) immediately and precisely dispatching rescue operations if any fire fighting resource indicates or is determined to be in danger. In the latter example, known GPS-based emergency locating systems can be used to automatically transmit the location of a fire fighting resource experiencing an emergency condition. See U.S. Pat. Nos. 5,418,537, 5,392,052, 5,367,306 and 5,355,140, each of which is incorporated herein by reference.

The computer system at the fire control center 20 includes a graphic display monitor that displays a continuously updated map indicating the location and condition of the fire, the terrain burning, the location and type of each fire fighting resource 30, 40, the location of each mobile or remote center 21–26 (see FIG. 2), and the location of airborne tracking craft 11. The image data from the satellite(s) 10 and surveillance craft 11, as well as the GPS data from each fire fighting resource 30, 40, is continuously or periodically communicated to the fire control headquarters 20, and is employed to construct and update the displayed map of the fire fighting activities. Field or remote command units 21–26 also include a graphic display and receiver that communicates with the fire control center 20. In that manner, the field command units 21–26 also continuously or periodically receive and display graphics showing the current state of the fire and location of all fire fighting resources 30, 40. Illustrative GPS-based mapping systems that can be used in conjunction with this aspect of the invention include U.S. Pat. Nos. 5,420,795, 5,381,338, 5,396,254, 5228,854 and 5,214,757, each of which is incorporated herein by reference.

In addition to the scanning or imaging equipment carried by the surveillance satellite 10 and craft 11, selected of the fire fighting resources 30, 40 are also configured to carry video or infrared sensors and associated computers. The image data acquired by the fire fighting resources 30, 40 is tagged with time and GPS location data, and is either stored for immediate analysis or transmitted via communication link 90 to remote (e.g. 21–26) or central 20 fire control headquarters. Thus, the fire control headquarters 20 also receives from selected of the fire fighting resources 30, 40 either image data or the results of remote image analysis operations.

Although FIGS. 1 and 1A graphically depict the fire fighting resources as trucks 30 and helicopters 40, it is specifically noted that such resources include remote controlled fire fighting systems, such as pilotless drones, driverless vehicles or robotic vehicles are also employed in fighting the fires. Combining GPS location data, expert system analysis and advanced communication networks allows the central (20) and remote (21–26) fire control centers to automatically and efficiently optimize fire fighting decisions, and if desired, to remotely control fire fighting resources 30, 40.

Thus, at least some of the pilotless or driverless craft 30, 40 are configured to carry and operate special fire fighting equipment, such as water streaming or dropping equipment, chemical fire fighting dispersal equipment, earth moving equipment, and the like. Machine vision with intelligent and expert computer systems using fuzzy logic and neural networks are employed not only to capture and transmit image data for analysis by the fire control centers 20–26, but also to control such remote controlled and robotic resources 30, 40. Available GPS-based remote control guidance systems are used to precisely guide such remote controlled and robotic resources 30, 40 to desired geographic coordinates to conduct specified fire fighting activities. Applicable GPS-based guidance systems include those shown in the following U.S. Pat. Nos.: 5,214,757; 5,193,064; 5,220,876; 5,247,440; 5,260,709; 5,270,936; 5,334,987; 5,361,212; 5,412,573; 5,420,795; and 5,438,817, each of which is incorporated herein by reference. Alternatively, other conventional remote guidance systems can be substituted, such as those employing radar, attached wire, image analysis, inertial guidance, etc., of the type commonly employed in guiding military missiles to targets.

In operation, remote controlled and robotic resources 30, 40 as shown in FIG. 1A are preloaded with water and/or chemicals in the fuselages, wings and/or auxiliary tanks, and placed on standby status. Promptly upon detecting and locating a fire, the fire control headquarters 20 issues via satellite or radio communication links 90 control signals to launch and guide the resources 30, 40 using applicable guidance systems such as those disclosed in the above-referenced and incorporated patents. When the mission is completed (for example, due to expenditure of fire extinguishing liquid), the remote controlled resources are automatically returned to their launching sites or bases, where its fire extinguishing loads are replenished and the craft readied for further operations.

It is also preferred to configure at least one mobile fire control center (indicated in FIG. 2 by the airborne remote control center 21) to carry backup computer and communication systems similar to those maintained at the central fire control headquarters 20. In that manner, even remote or large fires can be effectively monitored and controlled from close-in ground positions, or from the air, or from local airfields.

In areas of extremely high risk or frequent fire activities, video and infrared sensing units and associated image analysis systems are supported on towers or tethered balloons (referred to below as "local fixed surveillance systems"), and are linked to the fire control headquarters 20 or remote fire control centers 21–26. An imaging control subsystem within the local fixed surveillance systems monitor high risk occurrences, such as lighting strikes, and focusses the imaging system in the region of the occurrence to search for an anticipated fire 60. Similar "sense and focus" techniques may be incorporated into the imaging systems carried by the satellite 10, surveillance craft 11, and manned or robotic fire fighting resources 30, 40.

Figure 2:
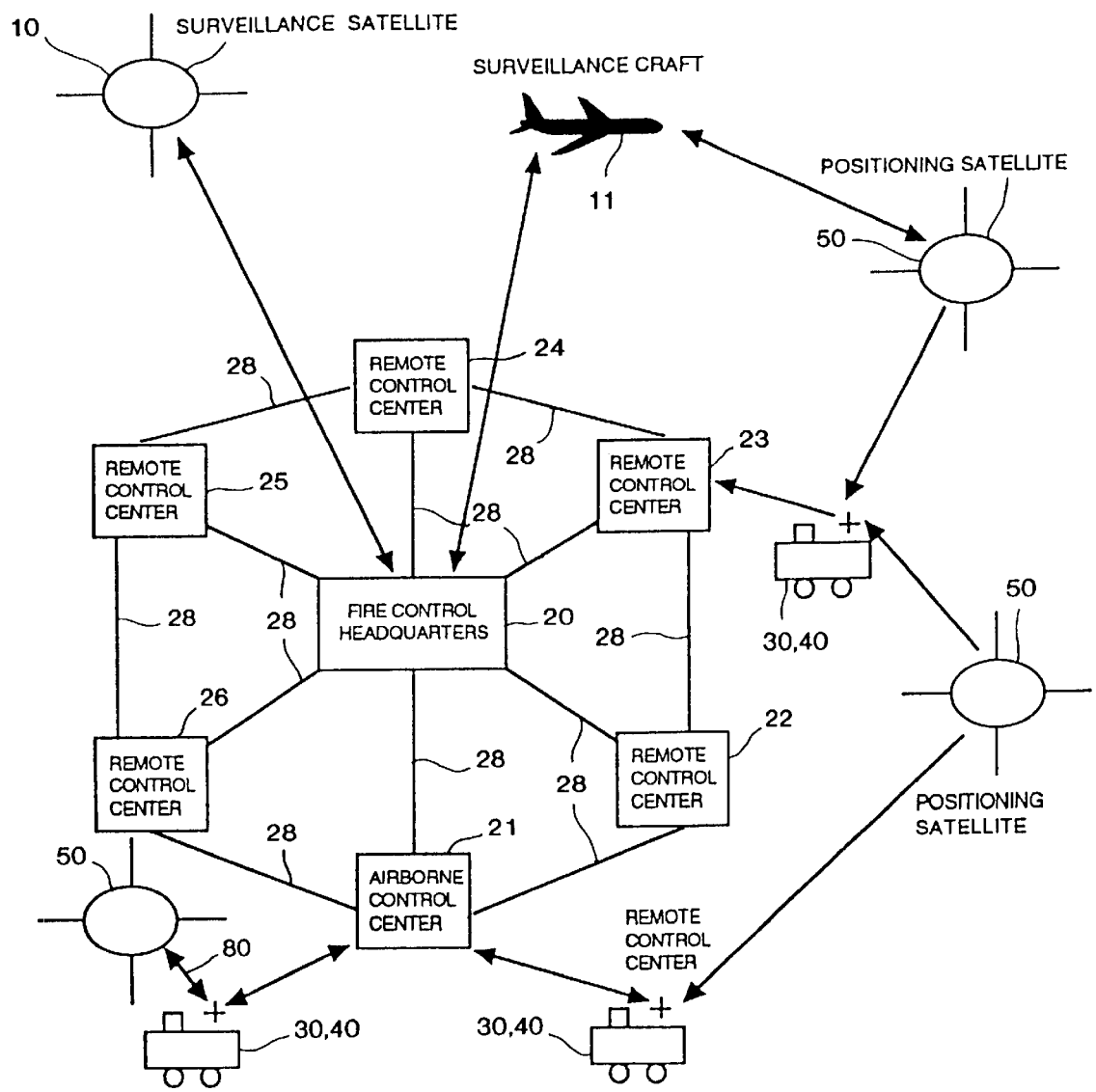
FIG. 2 illustrates a fire control dispatch system for use in the system of FIGS. 1 and 1A.

Shown in FIG. 2 is a more detailed diagram of a preferred configuration for the fire control and dispatch system of FIGS. 1 an 1A. As shown in FIG. 2, the fire control headquarters 20 communicates over links 28 with a number of remote or local fire control centers 21–26. The remote or local fire control centers 21–26 comprise either or both ground or airborne centers, including mobile centers, which are dispersed at different locations of the area under surveillance. Conventional data, voice and control communication links 28 allow full coordination between the remote control centers 21–26 and to fire control headquarters 20.

The remote control centers 21–26 are available to assist the fire control headquarters 30 with interrogating, dispatching, controlling and monitoring the varied manned and unmanned fire fighting resources 30, 40 of FIGS. 1 and 1A. In addition, the remote control centers 21–26 contain local sensing systems, such as surveillance and weather sensors, to capture, analyze and transmit pertinent information over communication links 28 to each other, to the fire control headquarters, and to the fire fighting resources 30, 40. The local weather and fire conditions are continuously updated at the remote control centers 21–26, and transmitted to the central fire control headquarters 20 for use by the expert system in carrying out automatic fire control computations and deriving optimal control strategies. As shown in FIG. 2, and as discussed earlier, precise geographic locating information, such as that generated from GPS satellites, receivers and data transmitters, is also monitored at each remote control center 21–26. Each remote control center 21–26 includes a computer and associated graphics display system that receives from fire control headquarters 20 an updated fire map and status of the pertinent fire fighting activities, as discussed in greater detail below.

Figure 3:
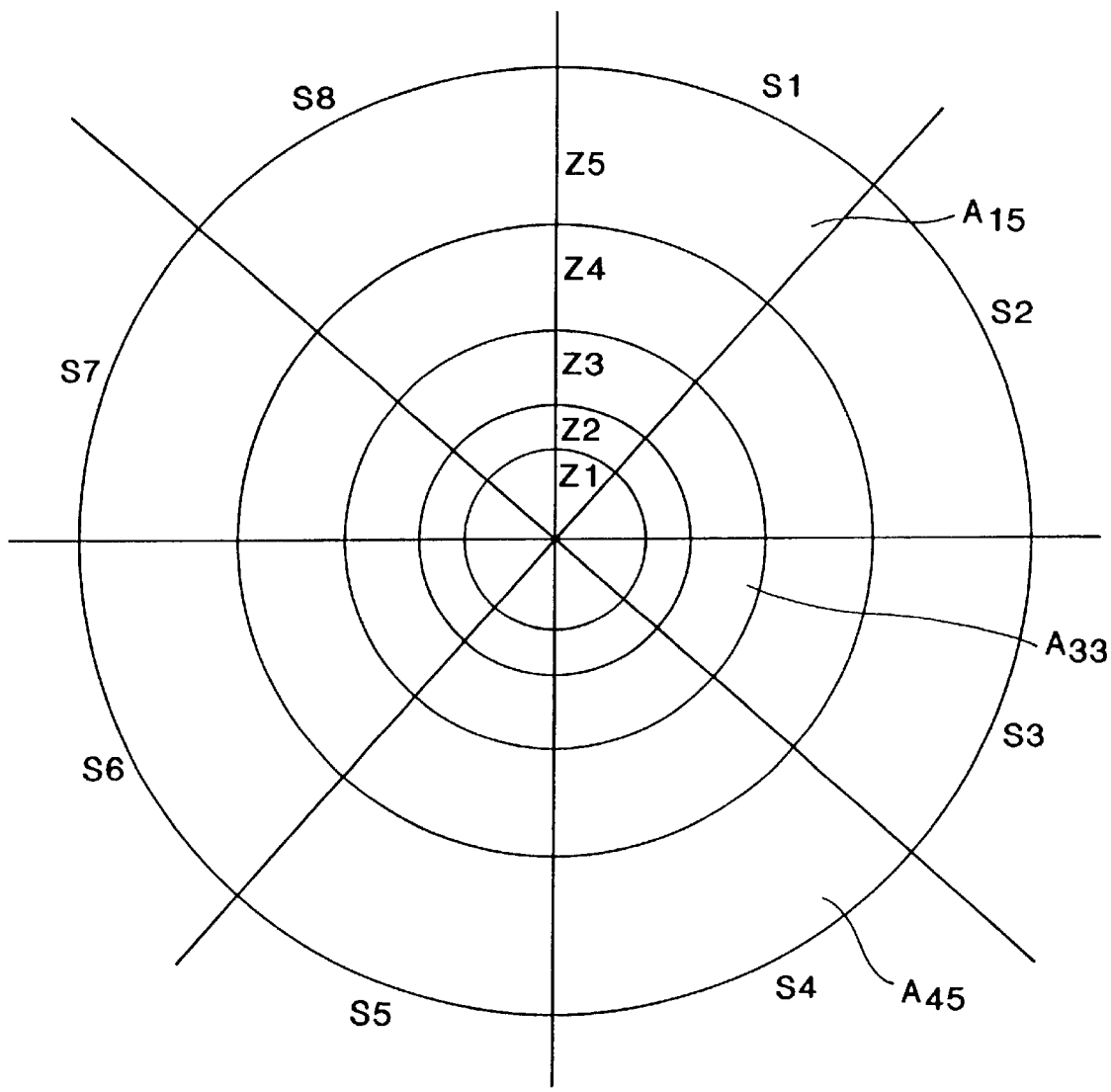
FIG. 3 illustrates a method of partitioning the scanned area into unique sectors and zones useful for computer analysis and display. Again, it is expressly noted that any equivalent partitioning method can be used. For example, shown in FIG. 16 below is a rectangular partitioning scheme.

FIG. 3 illustrates a preferred method of partitioning via an electronic display the monitored area in the vicinity of the fire. Partitioning the monitored areas into sectors S1–S8 and zones Z1–Z5 allows precise determination, location and designation of danger areas, and aids in the optimum dispatch of fire fighting resources 30, 40. More specifically, in the method illustrated in FIG. 3, the overall monitored area is divided into pie-slice sectors S1–S8, and concentric circular zones Z1–Z5. Specific areas in the partitioned space are identified as areas $A_{ij}$, where i refers to the ith sector and j to the jth zone of the overall area being scanned. The purpose of such a partitioning scheme is to precisely locate the indications of individual fires within the entire area, and further, to precisely indicate high priority areas for the accurate dispatch of fire fighting resources. If desired, and as the fire fighting activities progress, the overall area being monitored may be scrolled or scaled, for example, by controlling the imaging operations of the surveillance satellite 10, aircraft 11, and other image acquisition and analysis tools, so that the fire is displayed relatively centered to scale in the middle of the grid. In addition, the area $A_{ij}$ may be defined as large or as small as desired.

Figure 4:
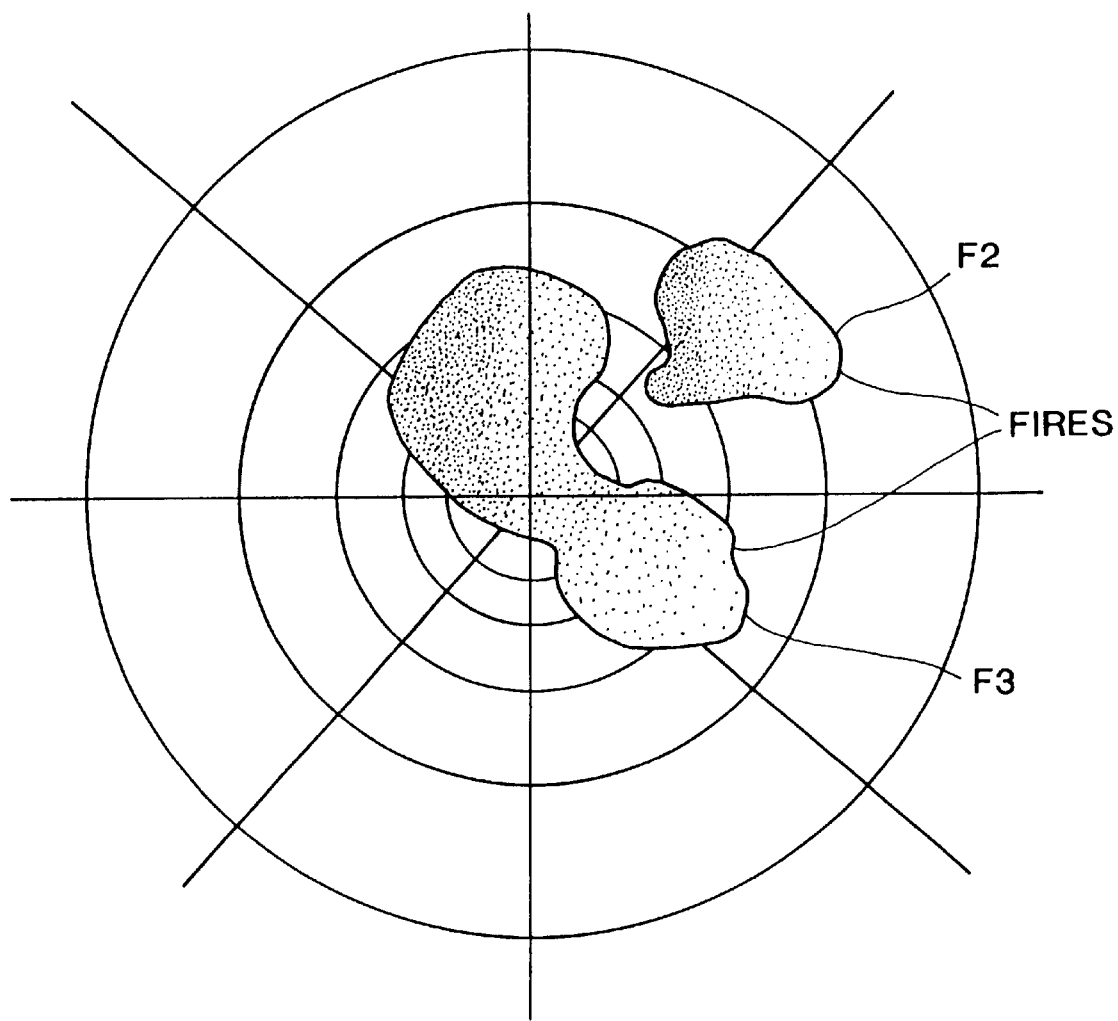
FIG. 4 is a partition similar to FIG. 3 illustrating the presence of fires in the area scanned.

FIG. 4 illustrates an electronic display defining a fire map using the sector and zone partitioning scheme of FIG. 3, and further showing two fires F3 and F2. As shown in FIG. 4, the fires F3 and F2 are separate and distinct from each other, and their overall contours and relative positions are electronically and individually indicated on the fire map. The individual sub-areas $A_{ij}$, where fires are present, are easily and specifically identified. The circular area partitioning illustrated in FIGS. 3 and 4 is useful in visualizing the extent and rate of growth of fires in individual sectors. Of course, other area partitioning schemes may be used, such as rectangular grids, as discussed below.

Figure 5:
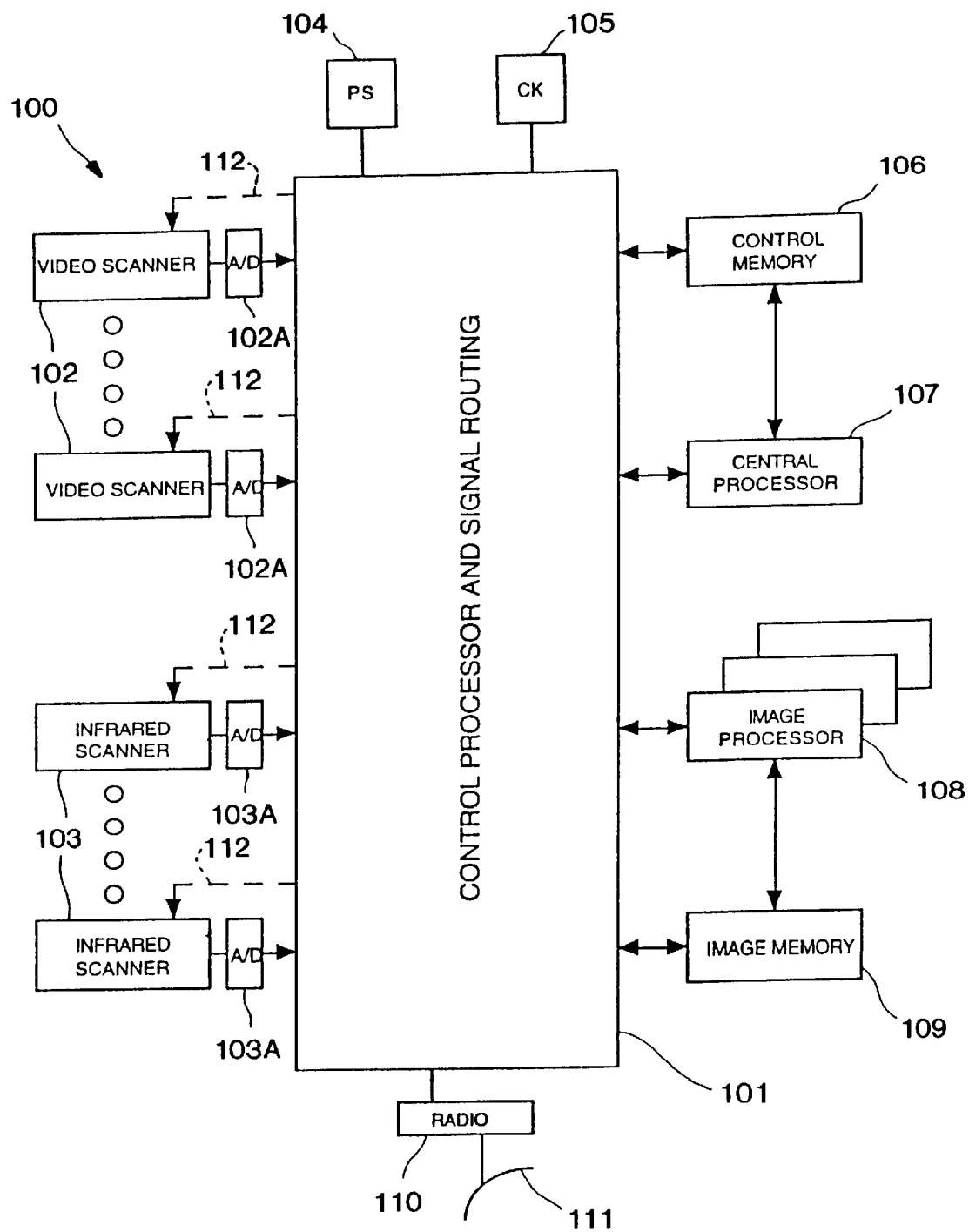
FIG. 5 illustrates one embodiment of a configuration for the scanning, processing and control equipment employed in the surveillance satellite. Although video and infrared scanners are described, any appropriate imaging device can be substituted.

FIG. 5 is a block diagram of a representative imaging and control system 100 for fire surveillance satellite 10 shown in FIG. 1 (or surveillance craft 11 of FIG. 1A). The imaging and control system 100 of FIG. 5 includes multiple video 102 and infrared 103 scanning devices that capture images for processing and transmission to the fire control headquarters 20. The satellite system 100 includes a control computer and signal routing system 101, which is used to interface the various video and control signals with radio, scanning, and processing equipment. The control processor and signal routing system 101 receives power from a satellite power supply system 104 and timing from a clock system 105. The power supply 104 may be supplied by associated solar panels (not shown). The clock system 105 is preferably synchronized with known internationally transmitted timing signals, enabling precise identification of date and time information for association with individual video and/or infrared scanning information derived by the scanners 102 and 103.

While FIG. 1 illustrates the use of a fire monitoring satellite 10, it will be apparent to those skilled in the art that monitoring may be accomplished from alternative airborne vehicles, such as airplanes, helicopters, pilotless drone, remotely controlled airborne vehicles, balloons, etc. To further illustrate applicant's intent that all such image acquisition and surveillance craft are contemplated, FIG. 1A expressly substitutes the use of an aircraft or pilotless drone 11 for surveillance and gathering of necessary data. As shown in FIG. 1A, satellite position indicating systems 50 are used to precisely locate and/or navigate the aircraft or pilotless drone 11. A pilotless craft 11 may be controlled and directed from any of the fire control centers 20–26 so that they travel to specific locations and scan particular areas for the existence of a fire 60.

As further illustrated in FIG. 5, the surveillance satellite 10 includes several conventional image acquisition or video scanners 102, 103 that scan and derive video and infrared signals of select areas on the earth. The video 102 and infrared 103 scanners are preferably individually controlled by control line 112 from the control processor and signal routing system 101. Such control is in turn preferably derived from information code signals received via command control radio links 70 (FIGS. 1, 1A) or 110, 111 (FIG. 5) from earth, and ideally, from the fire control headquarters 20. In that manner, the operation of the video scanning equipment 102, 103 of FIG. 5 is precisely and continuously controlled to scan and acquire images data from particular and specified areas of the earth. Further, such a configuration provides the flexibility necessary to periodically monitor a large number of areas, while more frequently monitoring high priority areas.

The video 102 and infrared 103 scanners are coupled through respective analog to digital (A/D) converters 102A and 103A illustrated in FIG. 5 for digitizing image signals and communicating them to the control processor and signal routing circuitry 101. The signal routing circuity 101 in turn transmits the data in real time to the fire control headquarters 20, or routes the image data to the appropriate memory 106, 109 and processing circuitry 107, 108, as shown in FIG. 5. Thus, the system has the ability to acquire, process and analyze image data on the surveillance satellite 10, or to communicate the image data to the fire control center for processing and analysis.

As shown in FIG. 5, the computer-controlled image processor 108, performs preliminary image processing and analysis operations with respect to image data derived from one or more of the video 102 or infrared 103 scanners. The image processor 108 is of conventional design, and typically includes a compact, high speed, parallel processor based, for example, on modern VLSI implementation of neural network elements or system(s). The image processor 108 may also be implemented using more conventional parallel processing structures implemented in compact VLSI form suitable for operation in a satellite configuration. The purpose of the image processor 108 of FIG. 5 is to process and analyze the image data to detect the presence of a fire, and to communicate the processed image signals to the fire control center 20 of FIG. 1 for storage or further evaluation. As illustrated in FIG. 5, the image processor 108 operates in conjunction with image signal memory 109 for the computerized analysis of digitized image signals derived from the video scanners and infrared scanners 103. As previously discussed, instead of or in addition to processing the data on board the satellite 10 or craft 11, the image data may be communicated directly to the fire control headquarters 20 for image processing and analysis. In the latter case, the image processor 108 and image memory 109 are also resident at the fire control headquarters 20.

Also illustrated in FIG. 5 is central processor 107, operating in conjunction with a control memory 106, for effecting the automatic control of the various subsystems of the satellite 10. The central processor 107, for example, is in communication with the ground based fire control headquarters 20 via the radio link 70 as illustrated in FIG. 1. Radio signals are transmitted via the radio transceiver 110 and antenna system 111 of FIG. 5. The central processor 107 operates in response to command and control signals stored in control memory 106, in combination with command and control signals received via radio link 70, to control the overall operation of the video 102 and infrared 103 scanners, image processor 108, and the transfer of coded or digitized image information and command control signals from the satellite 10 to fire control headquarters 20.

Figure 6:
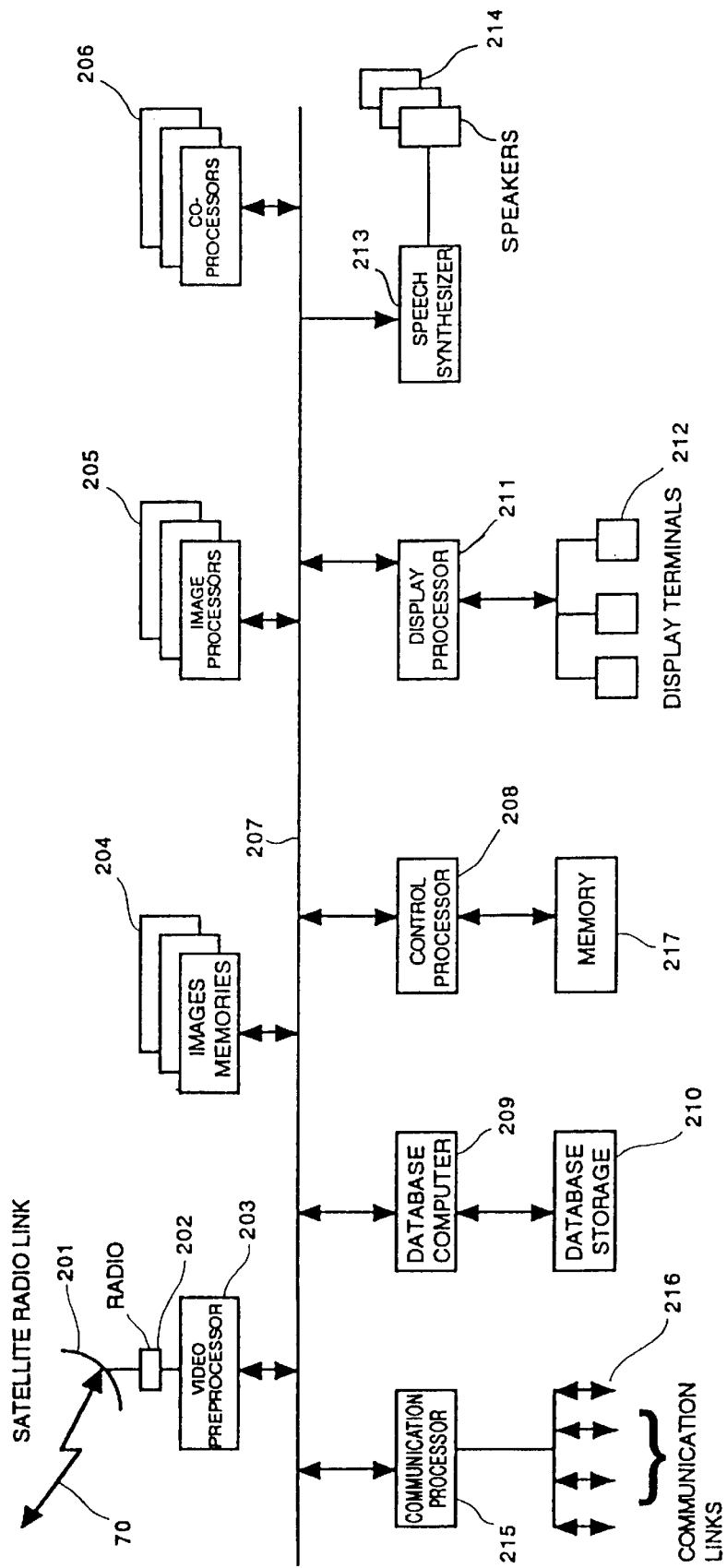
FIG. 6 illustrates a preferred embodiment for a control computer and communication system employed in the fire control headquarters.

FIG. 6 illustrates a preferred embodiment of the processing, control and communications systems used at fire control headquarters 20 of FIG. 1. The fire control headquarters 20 receives coded image signals from the control system 100 of the surveillance satellite 10. Communication of control and data signals between the satellite 10 and fire control headquarters 20 occurs via the satellite radio link 70, or any other appropriate communication link. Typically, data and control signals are received at the satellite receiving dish 201, and are transferred from a radio receiver 202 to video preprocessor 203. The video signal preprocessor 203 decodes video signals (e.g., individual picture frames) for transmission to a video image memory bank 204 via an interconnecting bus mechanism 207. Also received via the satellite link 70 from the satellite 10, are command decision signals indicative of the presence or absence of fire, as well as other status and control information. As discussed above, in the configuration of FIG. 1A, the signals are received in a similar manner at the fire control headquarters 20 from other surveillance craft 11, and from various of the remote control centers 21–26 and fire fighting resources 30, 40.

The video picture signals captured in image memories 204 of FIG. 6 are processed in an image processing block 205. The image processor 205 may be one or more of the numerous available high speed parallel processing computers designed to efficiently execute specific image processing algorithms to derive information concerning a desired phenomenon, in this case, a fire. The computer is programmed in accordance with common programming techniques to identify a fire, and to characterize the various features of the fire, such as the geographic boundaries of the fire; its direction and speed of movement, its intensity, etc. Multiple fires may also be detected using the image processor 205. Special purpose parallel co-processors 206 may be used, in a manner well known to those skilled in the image processing art, for efficient signal processing of the data derived via satellite link 70 and the various other communication links. Such parallel or co-processing techniques are particularly useful in implementing certain repetitive and structured mathematical operations associated with computer controlled image processing, such as high speed matrix manipulation. As generally shown in FIG. 6, the co-processors 206 communicate with the image processors 205 and image memories 204 via the communication bus 207. However, the use of massively parallel co-processors for high speed and detailed image analysis are well known to those of ordinary skill in the image processing art, as described in the following publications, each of which is incorporated herein by reference: Carpenter, G. A. and Grossberg, S., *Neural Networks for Vision and Image Processing*, MIT Press, Cambridge, Mass., 1992; Kittler, J. and Duff, M., *Image Processing system Architectures*, Research Studies Press LTD., Letachworth, England, 1985; Pearson, D., *Image Processing*, McGraw-Hill Book Company, New York, 1991; Teuber, J., *Digital Image Processing*, Prentice Hall, New York, 1993.

The control processor 208 and its associated data and program storage memory 217 control the overall operation of the fire control headquarters 20, including the processing and analysis of individual image signals, derivation of optimal control strategies, communication with remote control centers 21–26, surveillance satellites 10 and craft 11, and the various fire fighting resources 30, 40. As discussed in greater detail below, the control processor 208 is preferably an expert system computing unit operating based on fuzzy logic reasoning or other forms of artificial intelligence to evaluate all pertinent data on an ongoing basis as it is received from the various sources. The control processor 208 is programmed to derive and indicate preferred strategies for optimizing fire fighting activities. Expert systems are well known to those of ordinary skill in the art, as reflected in the following publications, each of which is incorporated by reference herein: Harmon, Paul and King, David, *Artificial Intelligence in Business—Expert Systems*, John Wiley & Sons, New York (1985), ISBN 0-471-81554-3; Gottinger, H. and Weimann, H., *Artificial Intelligence—a tool for industry and management*, Ellis Horwood, New York (1990), ISBN 0-13-048372-9; Mirzai, A. R., *Artificial Intelligence—Concepts and applications in engineering*, Chapman and Hall, New York (1990), ISBN 0-412-379007; Bourbakis, N, *Artificial Intelligence Methods and Applications*, World Scientific, New Jersey (1992), ISBN 981-02-1057-4; Schalkoff, R., *Artificial Intelligence: An Engineering Approach*, McGraw-Hill, New York (1990), ISBN 0-07-0550840; Frenzel Jr., L., *Crash Course in Artificial Intelligence and Expert Systems*, Howard W. Sams & Co., Indianapolis, Ind. (1987), ISBN 0-672-22443-7.

A preferred expert system implementation based on a fuzzy logic approach to fire fighting and control is further described below. The control processor 208 makes use of information received from the database computer 209. The database computer 209 maintains and draws information from the database storage unit 210. The database storage unit 210 contains extensive information describing the condition of terrain throughout the region(s) being monitored by the overall fire detection and control system, and continues to store and learn from new data received from the numerous sources discussed above. Terrain data for individual areas throughout the monitored region is maintained in the database unit 210, and periodically updated by well known GPSbased logging methods. Also included in the data base unit 210 is information reflecting the relative value of properties located in the monitored regions. Even after a fire is detected, the terrain and relative value information is updated on a continuous basis using, for example, information from the remote control centers illustrated in FIG. 2 and described above. Real-time information relating to the physical condition of the terrain and indicative of the degree of fire hazard in the area(s) under surveillance as influenced, for example, by the existence of drought or particularly dense combustible materials, is recorded in the memory of the database 210. This information is used together with the results of the analysis of image data received from the satellite 10 and surveillance craft 11, as described above, to derive the optimal fire fighting control strategies.

Code signals defining the results of computer processing and analysis of the various fire control factors (e.g., terrain, weather, etc.) are routed to an electronic display and input/output (I/O) processor 211. The display processor controls various types of display monitors and terminals 212 to show the current status of all tracked information. For example, at least one of the display terminals includes a display of the fire control grid of FIGS. 3 and 4, which includes a display of the fire and graphic symbols showing the tracked location of all dispatched and stand-by fire fighting resources. In more complex versions, weather and other geographic characteristics can be superimposed on fire control grid shown at the display terminals 212. The same or other monitors or displays 212 are configured to show in a graphic form actual or potential danger or priority zones. The display processor 211 also communicates over bus 207 with the communication processor 215, to allow transmission of the composite displays of the pertinent fire control conditions to displays at remote control centers 21–26 and the various fire control resources 30, 40.

The selected code signals defining the results of computer processing and analysis of the various fire control factors are routed to a synthetic speech generating computer 213 and associated speakers 214, which generate audible speech defining fire control warnings and commands. For example, if selected alarm condition is detected by the control processor 208, command warnings are both displayed on the terminals 212 and audibly over speakers 214. In that manner, the system immediately alerts fire control coordinators of dangerous fire situations and attracts their attention without undue delay which would otherwise be possible if only printed reports or visual displays were used. The speech synthesizer 213 is used not only to gain the attention of monitor station personnel, such as fire fighting coordinators, but also to specifically identify to them the areas where fires have been detected by the described electronic system and to recommend immediate action, such as the dispatching of nearby or available fire fighting resources 30, 40 and to indicate the location(s) of persons present in the dangerous area(s) so that they may evacuate or be rescued.

Also shown in FIG. 6 is a communication processor 215 connected to a plurality of communication channels or links 216. The communication processor 215 transmits and receives coded command control signals and data to and from remote control centers 21–26, and communicates fire control commands and information directly to the fire fighting resources 30, 40. The communication network defined by the links 216 may be dedicated radio or landline links communicating with remote control centers, or may be defined by a communication system comprising an established telephone switching system or cellular telephone system to communicate operable fire data and command messages to personnel in the field and to order the dispatch of suitable fire fighting equipment to select locations. High speed data communication links available via public, cellular and radio phone networks may also be used to transmit digital video picture signals as well as specific command and control messages to one or more field sites to graphically depict the fire and indicate dangerous situations to fire fighting personnel. The specific type of communication system and link is not critical to the invention, and any of the numerous available commercial or military communication systems and methods can be substituted.

Figure 7:
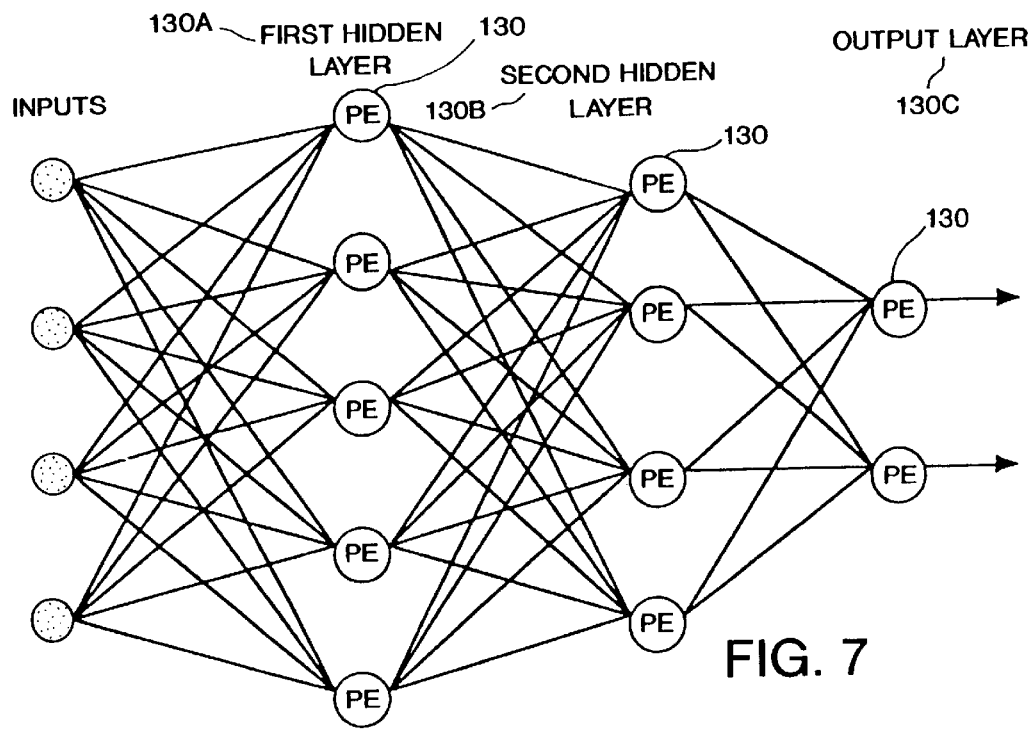
FIG. 7 illustrates one embodiment of a neural network of the type useful in the image analysis processors of the present invention.

Shown in FIG. 7 is one embodiment of a neural computing network having processing elements suitable for performing successive computations on image and other data (e.g., weather). Such neural computing networks are used to carry out the image processing in the computers 108 (of FIG. 5) and 205 (of FIG. 6). The neural network of FIG. 7 includes multiple processing elements 130 configured in layered structures. The processing elements (PE's) 130A, 130B and 130C map input signals vectors to the output decision layer, performing such tasks as image recognition and image parameter analysis. Although the layered structure of FIG. 7 is shown as a preferred embodiment, it is noted that any appropriate computer processing configuration can be substituted.

Figure 8:
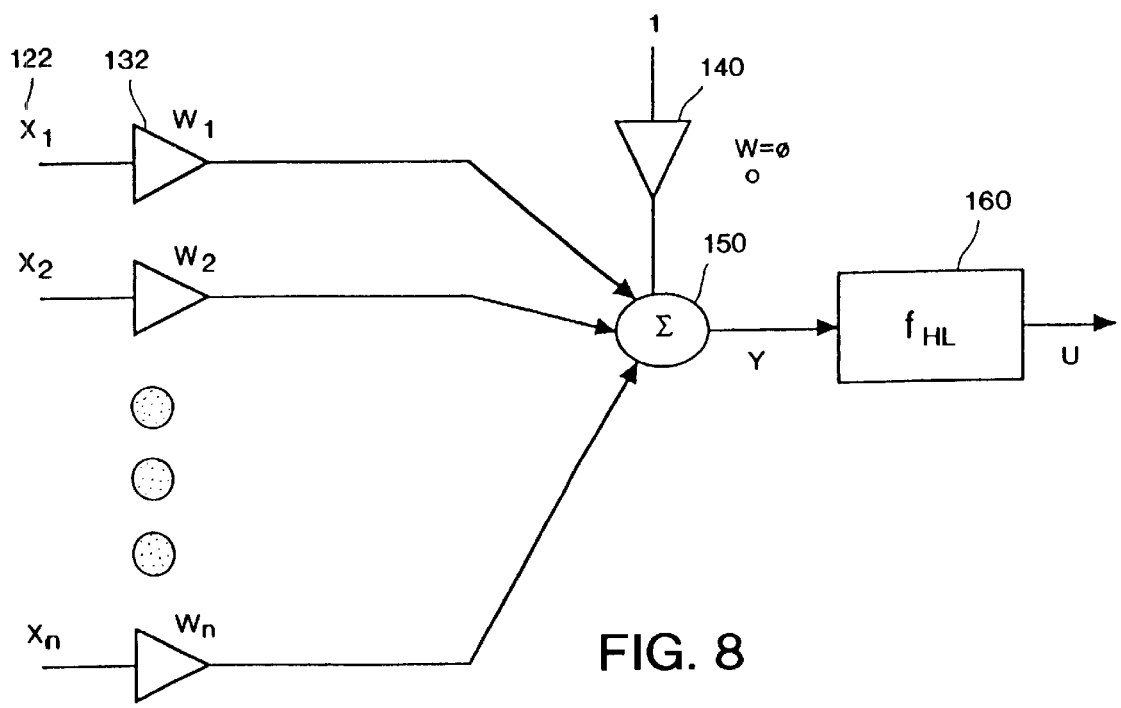
FIG. 8 illustrates one embodiment of a neural network processing element used in implementing the neural network of FIG. 7.

A typical neural network processing element or circuit is shown in FIG. 8. Input vectors 122 (identified as X1, X2 . . . Xn) are connected via weighting elements 132 (identified as W1, W2 . . . Wn) to a summing node 150. The output of node 150 is passed through a non-linear processing element 160 to produce an output signal U. Offset or bias inputs can be added to the inputs through a weighting circuit 140 (identified as $W_0$). The non-linear function 160 is preferably a continuous, differentiable function, such as a sigmoid, which is typically used in neural network processing element nodes.

In accordance with standard expert system and neural network programming techniques, the neural networks used in the fire detection and control system of the invention are trained to continuously analyze various types of image data to recognize, quantize and characterize fire images throughout the fire fighting effort. Training the network involves providing known inputs to the network resulting in desired output responses. The weights are automatically adjusted, based on error signal measurements, until the desired outputs are generated. Various learning algorithms may be applied. Adaptive operation is also possible with online adjustment of network weights to meet imaging requirements.

The neural network configuration of the image analysis computers of FIGS. 5 and 6 is preferably implemented in a highly parallel image processing structure, enabling rapid image analysis and recognition necessary for optimizing fire detection and decision making real time and automatic fire fighting decision. Very Large Scale Integrated (VLSI) circuit implementations of the neural processing elements provides a relatively low cost but highly reliable system important to a warning and automatic control system of the type herein disclosed. In particular, loss of any one processing element does not necessarily result in a processing system failure.

Figure 9:
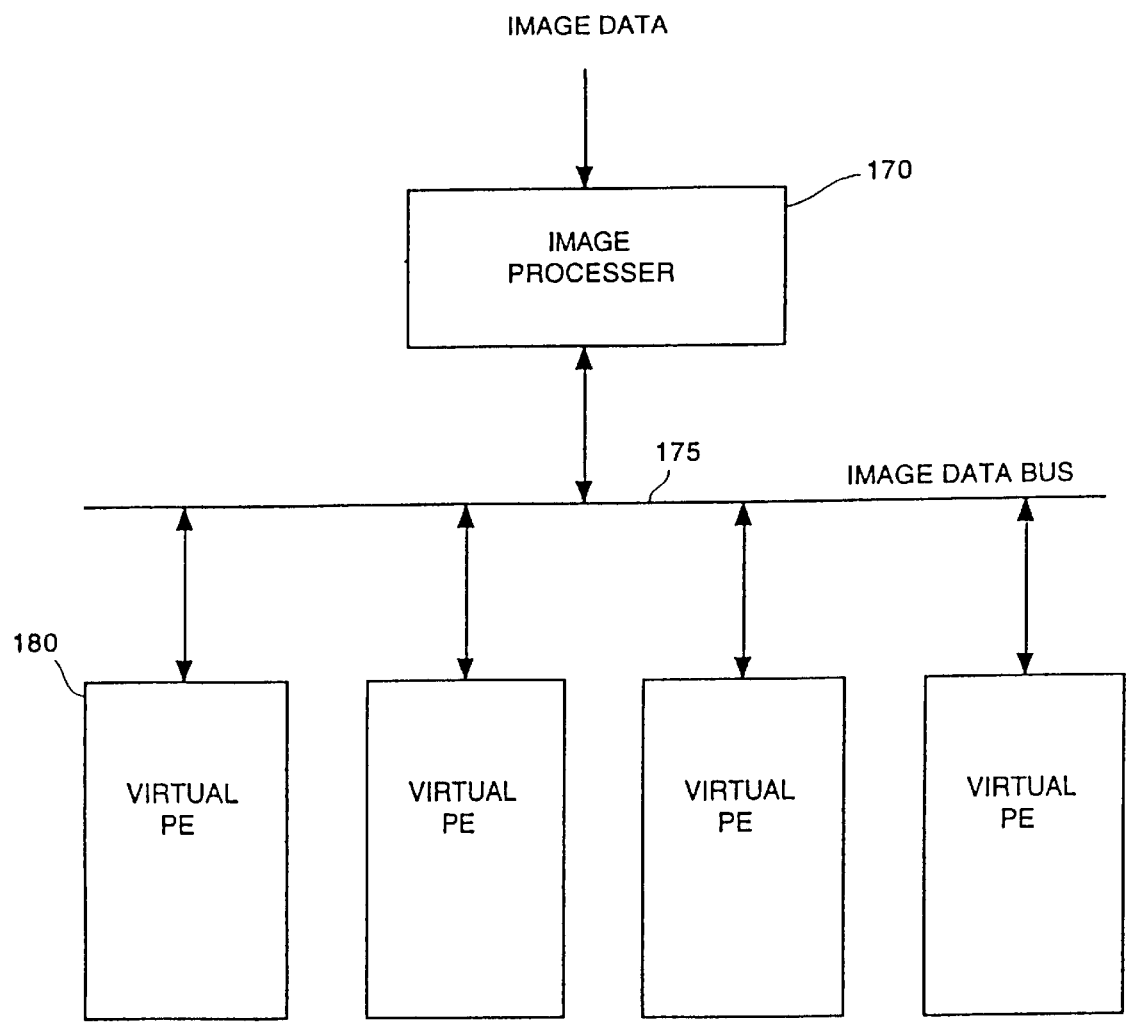
FIG. 9 illustrates an alternative embodiment of a neural network image processor using virtual processing elements.

Each of the programming techniques is well known to those of ordinary skill in the art, as discussed in the various references incorporated by reference above, and accordingly, are not repeated in detail here. Other processing implementations can be substituted. For example, in the alternate embodiment shown in FIG. 9, the neural computing network is implemented with multiple virtual processing elements 180 coupled to an image processor 170. Image data is presented to the image processor 170 over data bus 175 is routed to selected virtual processing elements 180, which implement the neural network computing functions. The virtual processing elements 180 may comprise pipe-lined processors to increase the overall speed and computational efficiency of the system.

In its preferred embodiment, the expert system control logic for control processor 208 of FIG. 6, employs fuzzy logic algorithmic structures to generate the command-control and warning signals. Fuzzy logic is particularly well suited to implement and help solve a complex problem, and to handle and analyze the multiplicity of image signals and environmental parameters generated, each of which may be defined by a range of values in different combinations which require different computing and fire fighting responses.

Using the previously described satellite video and infrared scanning and detecting methods, together with accurate location and tracking information using satellite positioning systems (e.g., GPS or GLONASS), the control processor 208 of FIG. 6 accurately locates and generate codes defining the global locations of persons and/or valuable properties in the sectors depicted in FIG. 3. The control processor 208, image processor 205 and database computer 209 analyze the contents of images of the monitored areas to fully characterize any fires. For example, the computer systems and image analysis methods determine the contour and the distance(s) between the edges of the fire, the locations of particular persons and/or valuable property in the path of the fire, the distance(s) from a select portion of an edge of a particular fire (such as one or more fires F3 and/or F2 shown in FIG. 4) to the locations of particular persons, properties or fire fighting resources 30, 40. Such distances define parameters which, when compared with the determined rate of the fire spread in that direction, determines the degree of danger to a particular location at any particular instant in time as the fire progresses.

In addition to detecting such distance(s), the computing systems, image analysis and fuzzy logic methods of this invention characterize other critical fire fighting factors to continually monitor and identify existing degrees of danger in various of the monitored geographic sectors. For example, the information relating to extent, location and combustibility of materials between the fire and the known location of persons, valuable property, natural resources, and fire fighting resources is used to further prioritize fire fighting decisions. For example, very dry conditions may be known to exist in a dense forest area, and further, that there is a high degree of combustible material present on the forest floor. Those conditions represent a very hazardous situation in the presence of fire. On the other hand, wide open areas with little or dispersed vegetation, or very wet conditions, represent a comparatively less dangerous situation. Other factors such as the presence of highways, rivers, lakes, intervening mountains, firebreaks or other natural or man-made barriers in the path of a fire further reduce the risk or danger factor in those areas. Thus, in a preferred embodiment, a combustion factor is defined and stored in the database 210 for each of the monitored sectors A11, A12, depicted in FIG. 3.

Another critical fire control factor is weather condition, such as the presence of a high wind, or in contrast, a driving rain. Thus, another input to the control computers is continuously updated weather conditions in the monitored areas. For example, weather conditions indicating the presence of high winds passing from a fire to an area of high concern (either due to population, natural resources, property values, wildlife, etc.) increases the risk or priority to that area. On the other hand, no wind, low wind or driving rain considerably reduces risk in that area.

Accordingly, one of the purposes of the remote fire control centers 21–26, satellites 10, surveillance craft 11, and the fire fighting resources 30, 40, is to continually update the computers at fire control headquarters 20 with current weather information, including specifically wind and rain conditions. In addition, such weather conditions can be continually downloaded from existing space or earth bound weather stations. It is preferred that the remote fire control centers 21–26, and various of the fire fighting resources 30, 40, contain sensors that continually measure important weather conditions such as wind velocity and direction and communicate that data continually or on-demand to the fire control headquarters 20. The weather information received at fire control headquarters 20 is analyzed and formatted for input to the fuzzy logic expert systems to optimize fire fighting decisions, and for display on terminals 212. Extremely high or increasing winds will not only impact fire fighting decisions, but may also result in the generation and communication of audible alarms and speech synthesized warnings, as discussed previously.

Determining the combined impact of critical fire fighting variables in an organized, accurate and real-time basis to assess or predict relative danger and priority zones requires a structured approach based on expert system knowledge and past experience with respect to risk assessment. Fuzzy logic electronic circuitry and software is a particularly attractive method for implementing such an expert system to determine and quantify the relative degree of danger for sectors of a monitored region, such as that depicted in FIGS. 3 and 4.

In a preferred embodiment, a danger index is derived for selected (or all) sectors of the monitored region, using fuzzy logic inference rules to evaluate critical fire fighting control factors, such as: the distance or distances between the fire and one or more locations of concern, the combustion factor between the fire and each location, the velocity of the wind in the direction from the fire to each location of concern, property values in the selected area, etc. Each of these parameters is computer analyzed and evaluated on a real-time basis and its quantified codes used in the fuzzy logic expert system to assist in optimizing fire fighting activities.

Additional factors critical to optimizing fire fighting decisions include the precise location and type of all available fire fighting resources 30, 40. The fuzzy logic expert systems of the present invention evaluate the derived relative danger factors and the known location of all available fire fighting resources 30, 40 to prioritize and automate dispatching decisions. As discussed above, in the preferred form, the fire fighting resources 30, 40 are continually monitored to determine their precise geographic location using GPS satellite positioning and associated data communication methods. If data defining images of the fire or weather are transmitted from remote control centers 21–26, non-orbiting surveillance craft 11, or other fire fighting resources 30, 40, such data is also "tagged" with GPS-based identifiers. In that manner, all relevant information is stored in the data base 210 and used by the control processor 208 in a manner that is keyed to precise geographic data. Thus, data defining relevant fire control factors are transmitted to the fire control headquarters 20 on a real-time basis over communication links 70. Such data communication is managed by the communication computer or processor 215, and the database computer 209 and associated storage unit 210, as depicted in FIG. 6. The data acquired and stored at the fire control headquarters is thereafter used in comprehensive fuzzy logic analyses to optimize fire control decisions.

FIGS. 10A–10D illustrate exemplary fuzzy logic membership classifications for four of the fire control factors discussed above. The classifications and memberships disclosed in FIGS. 10A through 10D are to be considered as examples only, and can be expanded, contracted or varied to accommodate additional, fewer or different fire control factors.

Figure 10A:
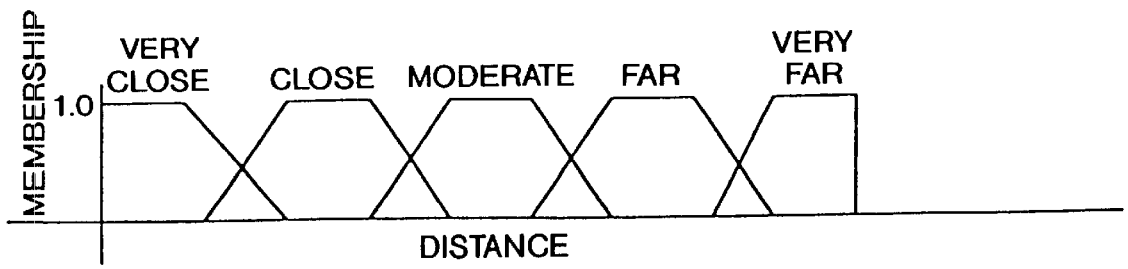
FIGS. 10A, 10B, 10C and 10D, illustrate representative fuzzy logic memberships useful in an expert system to analyze fire control factors. Although specific fire control factors are shown, such as distance, combustion factor and wind factor, numerous other factors can be added or substituted for those shown in FIGS. 10A–10D.

FIG. 10A illustrates possible membership grades for distance(s) between the location(s) of concern and the spreading fire or fires. Using standard fuzzy logic membership classification methods, overlapping membership categories are defined for such distances as very close, close, medium, far and very far. Trapezoidal membership classification is used with the sum of the overlapping memberships always equal to one. The actual distance(s) may be measured in feet, miles, meters or kilometers, for example, as appropriate and most convenient in a particular situation. Fire fighting experts can apply their extensive knowledge from past fire fighting experiences to classify the distances in the appropriate membership grades.

Figure 10B:
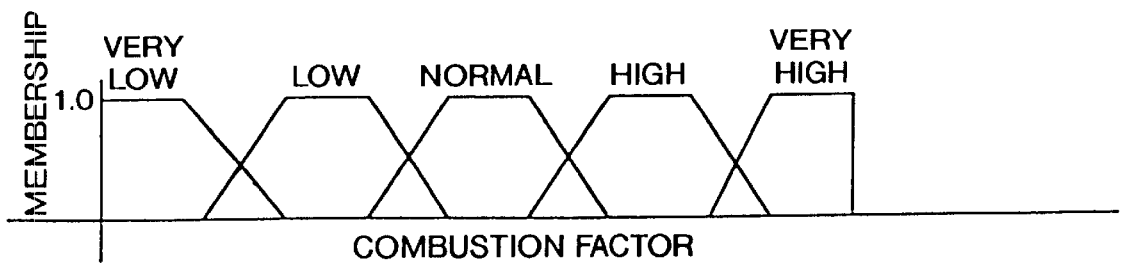

The combustion factor variable is similarly defined as shown in FIG. 10B, as an input to the disclosed fuzzy logic control system. Five membership classifications are defined corresponding to very low, low, normal, high and very high combustion situations in each of the areas depicted in FIGS. 3 and 4. As noted above, the combustion factors will depend upon features of the natural environment, whether that environment is dry or wet, and the presence, location and extent of natural or man-made fire breaks that are located in particular areas. The appropriate combustion factor between the fire and a particular location in the area being monitored is considered as the weighted average of a number of such combustion factors for the intervening areas between the fire and the location of concern. As an alternative, the highest combustion factor in the path of a fire is used to determine the degree of fire danger at a particular location. Other averaging approaches where multiple areas exist between the fire and the location of concern can be used, and will be apparent to experienced system programmers using the disclosed fuzzy logic methods.

Figure 10C:
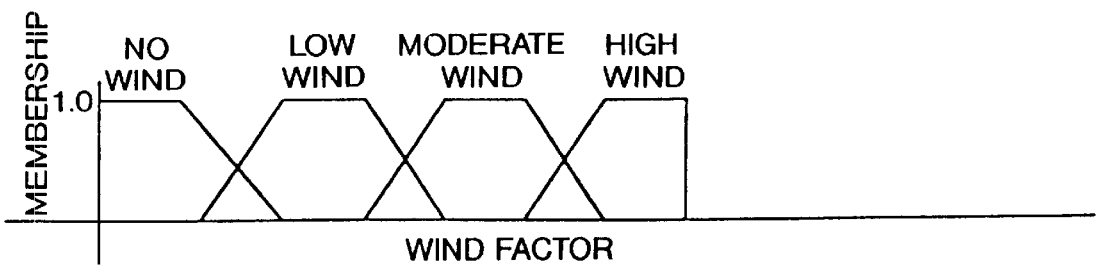

FIG. 10C illustrates exemplary membership grades for wind factor as an input variable to the disclosed fuzzy logic inference rules. As shown, the membership grade varies between 0 and 1, with overlapping membership categories based on the assessment of danger represented by different wind conditions. The wind factor evaluated is the velocity of the wind in the direction from the fire to the location of concern. The wind factor may be evaluated from actual wind measurements and from the rate of spread of the fire as determined by video and/or infrared scanning. The appropriate wind velocity vector can be calculated using well known vector algebra and trigonometric techniques based on the actual wind direction and velocity and the direction from the fire to the location of concern in the monitored area. Four categories of wind velocity in the direction from the fire to the location of concern are shown in FIG. 10C: no wind, low wind, moderate wind and high wind. Once again, fire fighting experts are able to define appropriate ranges for the various wind velocity classifications shown in FIG. 10c.

Figure 10D:
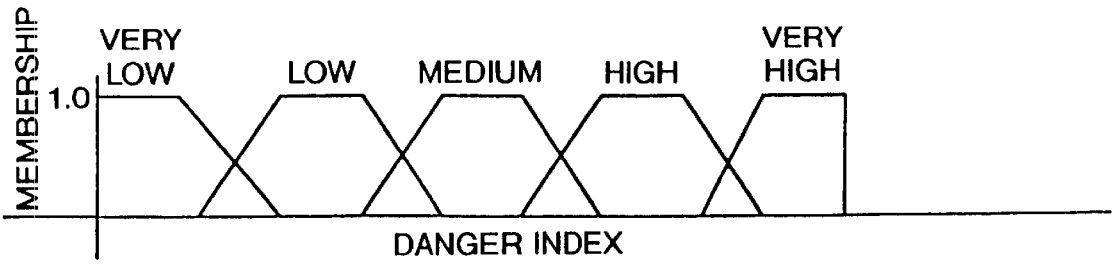

FIG. 10D illustrates fuzzy logic membership grades for the output of the fuzzy logic inference system and method discussed above. The output variable is a computed fire danger index applicable for analyzing particular sectors or locations in the monitored region illustrated in FIGS. 3 and 4. Five classifications of danger are illustrated in FIG. 10D: very low, low, normal, high and very high. The danger index classifications overlap in accordance with standard fuzzy logic principles. In the example shown in FIG. 10, the danger index for a particular sector or location in FIGS. 3 and 4 is calculated using fuzzy logic inference rules based on the selected input variables of distance, combustion factor(s) and wind factor(s) as illustrated in FIGS. 10A, 10B and 10C. The result is a numerical danger index defined in accordance with the overlapping fuzzy logic membership classifications of FIG. 10D.

FIG. 11 presents exemplary fuzzy logic inference rules used by an expert system to evaluate the three input variables defined in FIGS. 10A, 10B and 10C, and employed to produce the appropriate danger index output classification according to FIG. 10D. Four illustrative tables are shown in FIG. 11, corresponding to wind classifications extending between and in the directions from the fire to the area of concern and defined as none, low, moderate and high corresponding to the membership classifications of FIG. 10C. The combustion factor and distance variables are represented by the rows and columns of each respective matrix of FIG. 11. Reading across the column headings, distances corresponding to very close (VC), close (C), medium (M), far (F), and very far (VF) are indicated. Similarly, combustion factors of very low (VL), low(L), normal (N), high (H) and very high (VH) are indicated in the respective rows. The values in each of the respective matrices then corresponds to the classifications of the danger index as represented in FIG. 10D. That is, the danger indices are indicted as being very low (VL), low (L), medium (M), high (H) and very high (VH). For example, reading from the danger index fuzzy logic inference rule table corresponding to low wind, selected inference rules are indicated as follows:

IF: (i) WIND=LOW, and (ii) DISTANCE=FAR, and (iii) COMBUSTION FACTOR=HIGH, then DANGER INDEX=MEDIUM.

IF: (i) WIND=LOW, and (ii) DISTANCE=CLOSE, and (iii) COMBUSTION FACTOR=HIGH, then DANGER INDEX=VERY HIGH.

Similarly, representative danger indices read from the matrix corresponding to high wind are as follows:

IF: (i) WIND=HIGH, and (ii) DISTANCE=VERY CLOSE, and (iii) COMBUSTION FACTOR= NORMAL, then DANGER INDEX=VERY HIGH.

IF: (i) WIND=HIGH, and (ii) DISTANCE=MEDIUM, and (iii) COMBUSTION FACTOR=NORMAL, then DANGER INDEX=HIGH.

IF: (i) WIND=HIGH, and (ii) AND DISTANCE= MEDIUM, and (iii) COMBUSTION FACTOR=VERY HIGH, then DANGER INDEX=VERY HIGH.

As can be seen from the danger index fuzzy logic inference rules depicted in FIG. 11, the expert system of the present invention reduces a potentially complex set of input information defining the fire and the environmental parameters to a manageable fuzzy logic calculation resulting in a danger index associated with each (or selected) of the sectors of the monitored area.

Depending on the values of particular input parameters, and the overlapping regions of those parameters, as defined in the membership grades of FIGS. 10A, 10B and 10C, more than one of the fuzzy logic inference rules of FIG. 11 may be triggered by a given set of circumstances. In such cases, the most appropriate danger index can be calculated using well known fuzzy logic calculation procedures for defuzzification, such as the centroid method. This method permits real-time evaluation of the danger index for each of the areas of a monitored region such as shown in FIGS. 3 and 4, or for particular locations within regions depending upon the requirements and fire fighting situation. Combining the calculation of a specific danger index for each area with real-time display of the location and type of fire fighting resources 30, 40, and the use of advanced communication of such information to the entire fire fighting team, allows fire fighting commanders to make proper decisions based on a large amount of complex but current data.

Figure 11A:
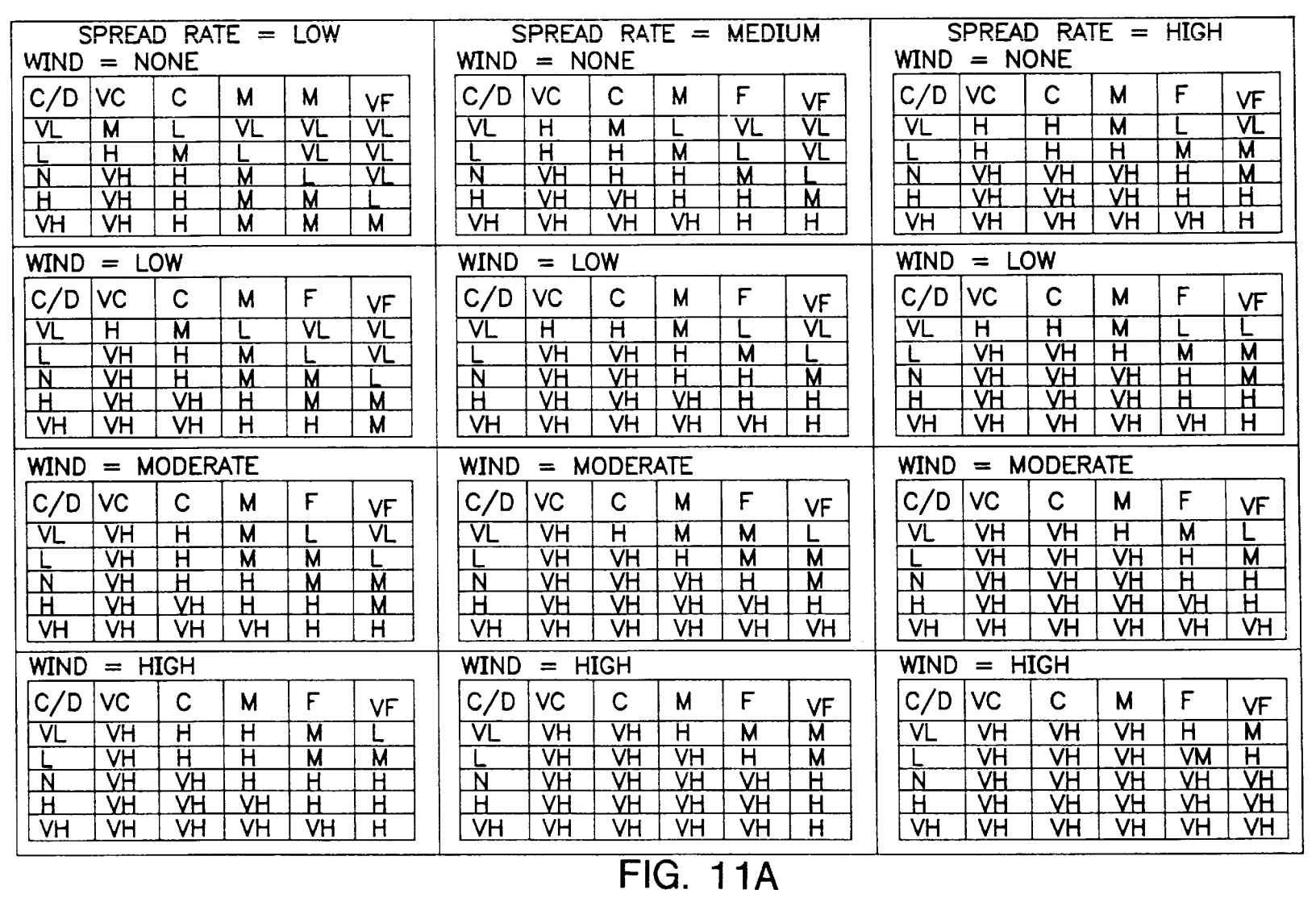

FIG. 11A further illustrates additional fizzy logic inference rules applicable to the fire fighting control systems and methods of the present invention. The additional inference rules of FIG. 11A add consideration of another fire fighting factor—the measured rate of spread of the fire. As discussed in greater detail above, the rate of spread of the fire may be determined from data received from the video and/or infrared scanning information derived from the satellite 10 or airborne 11 scanners of FIGS. 1 and 1A, from the remote fire control centers 21–26, or from the fire fighting resources 30, 40. Three spread rates are indicated in FIG. 11A: low, medium and high. Corresponding trapezoidal membership functions are defined to incorporate the additional information into the total fuzzy logic calculation of danger indices. The fuzzy logic inference rule tables of FIGS. 11 and 11A are referred to as Fuzzy Associative Memories (FAM's) that are rapidly accessed based on parameter values for real time calculations. Additional FAM's can be developed by the skilled artisan to more completely consider further fire control factors, such as the known location of dispatched fire fighting resources.

Thus, the above-described danger index calculation method is used to quickly calculate, in real-time, a danger index for each of the areas $A_{11}, A_{12}, A_{13} \ldots$ defined in FIG. 3. The resulting data is organized in a danger index matrix, D, as illustrated in FIG. 12. In the presentation of FIG. 12, the rows of the danger index matrix D correspond to the eight sectors represented in FIG. 3, while the columns correspond to the five zones in the monitored area. With this definition, the danger index matrix D is a 8×5 matrix. The danger indices $D_{11}, D_{12} \ldots$ correspond to the calculated danger in the corresponding sector of the monitored region. If desired, the danger index matrix can be further subdivided to reflect particular locations within each sector or area.

The danger index matrix D is used to help fire fighters optimize fire fighting decisions. In more advanced forms, the danger index matrix uses additional information concerning the relative importance or value of different areas within the monitored region. Such value assignments are made based on the presence of persons and/or the value of property or other natural resources (e.g., wildlife preserves, loggable timber, etc.). Such factors are used to assign a value index to each of the areas in the region of FIG. 3. The relative value indices are in turn organized in a value matrix, V, such as illustrated in FIG. 13. The rows of the matrix V correspond to the 5 circular zones of FIG. 3, and the columns in turn correspond to the 8 sectors. Thus, the value variable V23 represents the value assigned to the area defined by zone 2 and sector 3 of FIG. 3.

The expert system uses the value matrix entries of FIG. 13 and the danger index values of FIG. 12 to determine more specific priorities for fighting fires in particular areas of the monitored region. For example, a priority indication is obtained by multiplying the danger index for each area by the value ascribed to that area. Areas that have already burned or where the fire is under control, may be indicated with a low value of danger index which assures a low value of priority in terms of dispatching of fire fighting resources. Ranking the results for each area in descending order defines a set of priorities for fighting the fire. The control processor 208 recommends or initiates the dispatching of appropriate fire fighting resources 30, 40 to the higher priority areas. Again, by continually tracking the type and location of all available and committed fire fighting resources 30, 40, the control processor 208 uses expert system and fuzzy logic reasoning to optimize allocation of resources to all high priority areas. As a result, the best available fire fighting resources 30, 40 are properly dispatched on a real-time basis to the areas in immediate danger, and such resources are not diverted in the areas of lowest priority.

Figures 14, 16:
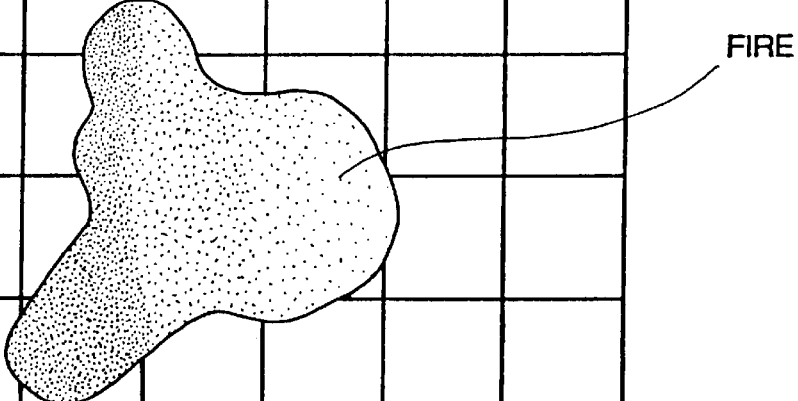
FIG. 14 illustrates a sample calculation for a sector priority vector using the value matrix and danger index matrix.
FIG. 16 illustrates an alternate embodiment of the invention using rectangular fire control areas.

It still another refinement of the preferred embodiment, it is desirable to prioritize the eight sectors shown in FIGS. 3 and 4 by computing for the sector of interest the "inner" or "dot product" of the respective row and column vectors of the value matrix V of FIG. 13 and danger index matrix D of FIG. 12. For example, a priority value for sector 1 as a whole is obtained as the sum of the products of the individual matrix elements from row 1 of the value matrix V and column 1 of the danger matrix D. Repeating this calculation for each of the various sectors will result in a sector priority vector as indicated in FIG. 14. Using such a vector, fire fighting resources are dispatched to the highest priority sector.

Figure 15:
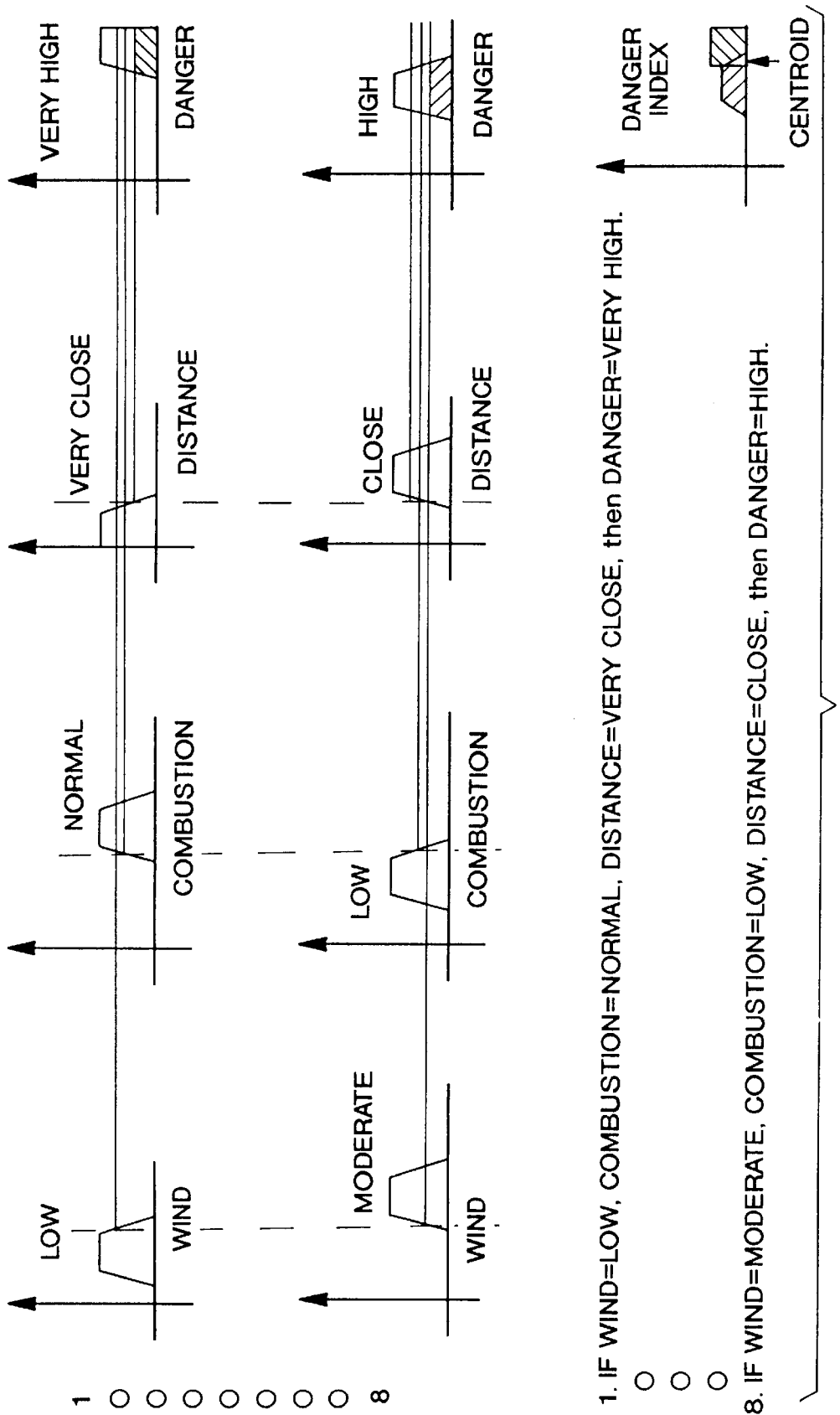
FIG. 15 provides a representative fuzzy logic danger index calculation.

FIG. 15 illustrates in graphic form an example danger index calculation based on the above-described fuzzy logic reasoning. The calculation of FIG. 15 corresponds to a computation of the danger index for a particular area within a monitored region, for example, areas Aij of FIG. 3. In the case illustrated in FIG. 15, particular values exist for the wind index, the combustion index and the distance index, each of which serves as an input to the fuzzy logic computation used to determine a resultant danger index for the area Aij. For the values of the wind, combustion, and distance variables that exist, eight of the fuzzy logic inference rules of FIG. 11 are shown. Two of these are illustrated in FIG. 15. The first corresponds to the "Wind=Low" table of FIG. 11, and is stated as rule 1 in FIG. 15 as:

IF: (i) WIND=LOW, (ii) COMBUSTION=NORMAL, and (iii) DISTANCE=VERY CLOSE, then DANGER=VERY HIGH.

The second corresponds to the "Wind=Moderate" table of FIG. 11, and is stated as follows:

IF: (i) WIND=MODERATE, (ii) COMBUSTION=LOW, and (iii) DISTANCE=CLOSE, then DANGER=VERY HIGH.

As shown in the graphic analysis of FIG. 15, each of the input variables is in the "fuzzy area" of its definition between respective membership classifications. The particular wind value, for example, is somewhere between low and moderate, while the combustion index is between low and normal, and the distance is between close and very close. Using fuzzy logic calculation procedures, the corresponding value of the danger index for each combination of the indicated values is computed. Two of the eight calculations are actually shown in FIG. 15. Both the high and very high danger index membership classifications are involved in the two example computations. As also indicated in FIG. 15, it is necessary to combine the results from the very high and high danger index classifications in a "defuzzification" process to compute an appropriate resultant value for the final danger index for the given conditions. The "defuzzification" is accomplished by overlaying the respective areas from the computations to identify the intersection of the respective membership classification variables. Using such standard fuzzy logic procedures, defuzzification is accomplished by computing the centroid of the resulting areas as indicated in FIG. 15. In fact, eight such results would be included in the centroid calculation. Of course, other defuzzification procedures may be used depending on the particular algorithm implemented in the methods herein taught.

The procedure discussed in connection with FIG. 15, is carried out for each of the areas Aij in FIG. 3, corresponding to the monitored region. The resultant calculations result in the danger index matrix illustrated in FIG. 12. The danger index values are used in computing the fire fighting priority vectors in accordance with the methods described above.

Figure 17:
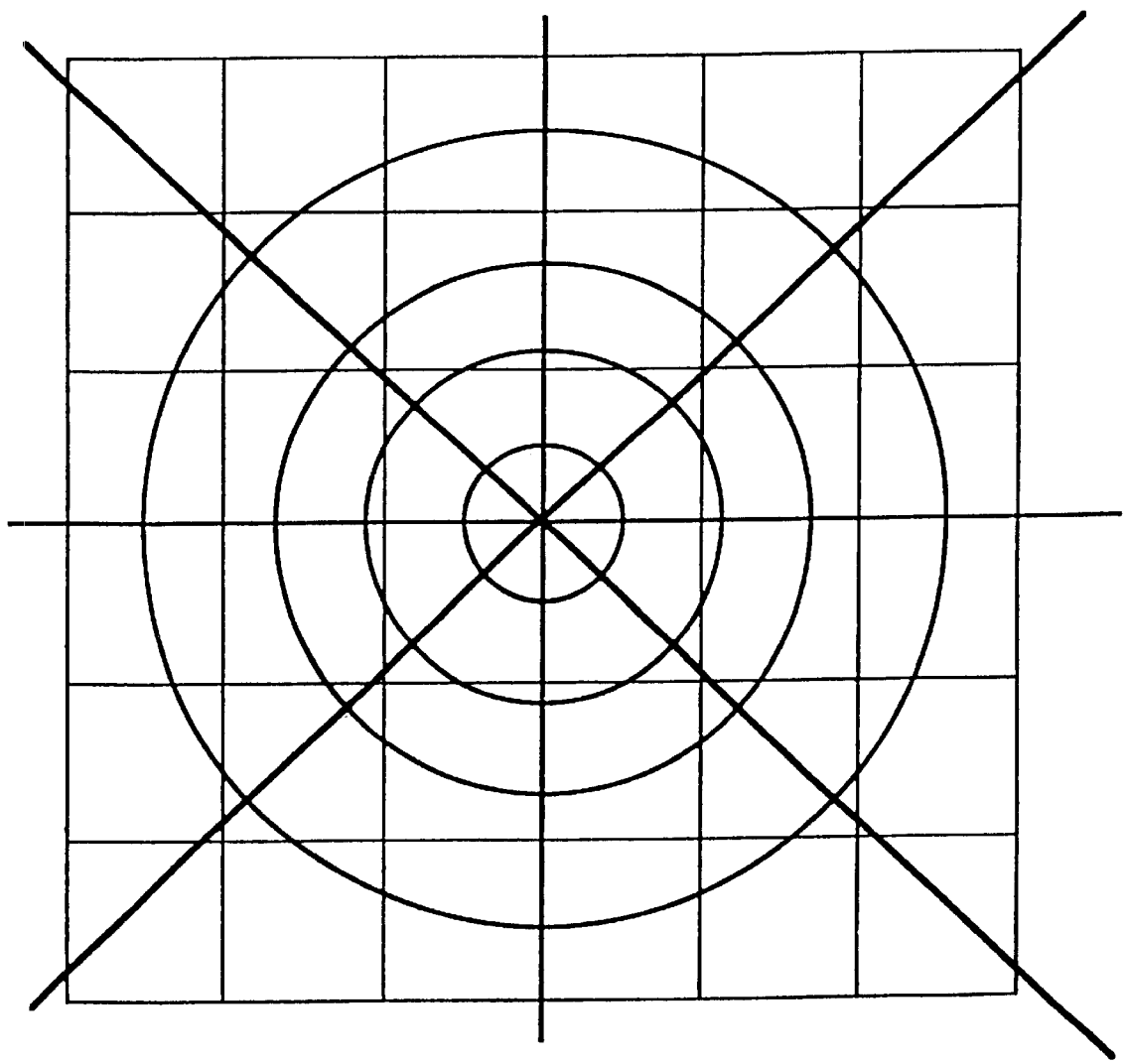
FIG. 17 illustrates the use of the rectangular control areas of FIG. 16 for computing relative danger values for areas in the map based on circular sectors and zones.

The use of a rectangular coordinate system with corresponding rectangular sub-areas, as illustrated in FIG. 16, is particularly useful in assigning relative priority values to individual sub-areas. Such conversion is accomplished by overlaying the circular evaluation pattern of FIGS. 3 and 4 over the rectangular coordinate map of FIG. 16, as illustrated in FIG. 17. A corresponding rectangular area priority matrix is shown in FIG. 18. Superimposing the circular evaluation pattern of FIGS. 3 and 4 over the rectangular coordinate map of FIG. 16 permits evaluation of relative values of the circular sub-area sectors by integrating and computing the fraction of each rectangular sub-area contained within the corresponding circular sub-areas.

For example, assuming a uniform distribution of value across the rectangular areas permits evaluation of a value corresponding to the circular sub-sector areas. Thus, a database premised on a rectangular coordinate system containing sub-area values can be converted to the circular areas described earlier. Also, in another embodiment, it may prove desirable to use the rectangular coordinate system without the circular sector analysis. Those skilled in the art will be able to easily adapt the above-described calculation procedures for circular areas to a rectangular coordinate system with similar fuzzy logic evaluations and prioritization.

Another useful method for optimizing fire fighting decisions is to consider priorities in each area and in surrounding areas. This may be accomplished, for example, by summing priorities immediately adjacent to each individual area with the priority for each area to result in an adjacent node priority matrix as shown in FIG. 19. This adjacency approach may indicate, for example, that it is important to fight a fire in a particular area because of the fire danger to adjacent areas.

Figure 20:
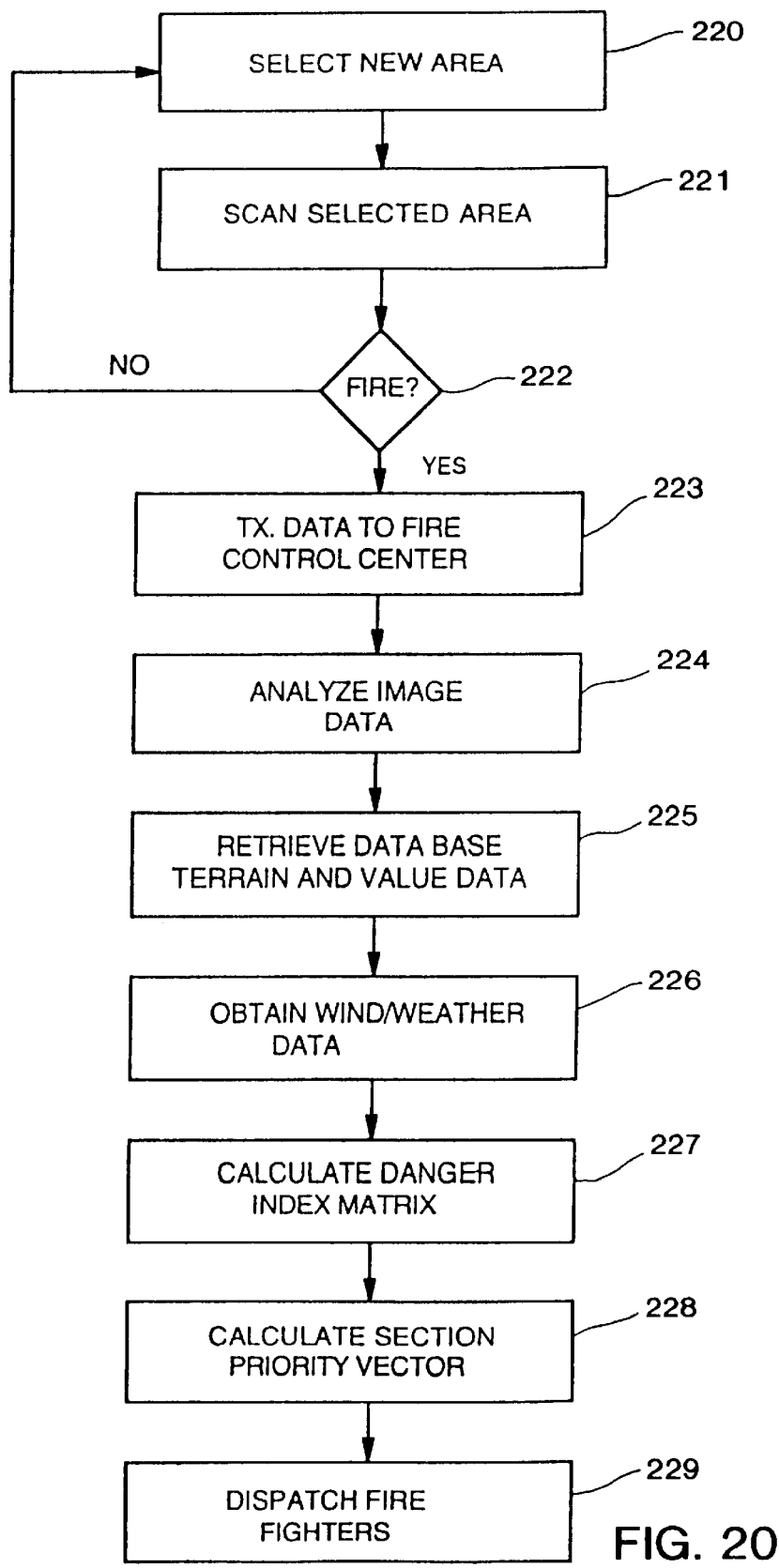
FIG. 20 illustrates one embodiment of an overall fire control process flow for the present invention.

FIG. 20 is a preferred flow diagram for the fire control process computation methods described above. The overall process begins in block 220, which selects a new area to be monitored by the fire fighting system. Block 221 corresponds to the actual imaging or scanning of the selected area using any of many available imaging systems, such as the surveillance satellite 10 or craft 11, shown in FIG. 1 or 1A. If no fire is so detected, another area for scanning is automatically selected as indicated in FIG. 20. The image data may be analyzed in the surveillance source 10, 11, or transmitted to the fire control headquarters for analysis, as shown in block 223. In block 224 the image data received at the fire fighting control headquarters 20 from the surveillance source 10, 11 is further analyzed by computer to fully characterize all important fire fighting factors, such as the fire's precise location, rate of spread, it intensity, etc. At the same time, terrain and value data is retrieved from the database 210, as referenced in block 225. Among other things, the terrain data describes and characterizes the combustion factor index, as described in connection with FIG. 10, and values for the area value matrix, as described in connection with FIG. 12. As noted above, the combustion factor and value indices may be changed from time to time depending upon environmental changes and from surveys of areas to be monitored. Wind data is also obtained from the database retrieval system, as referenced in block 226. The wind data, of course, is updated on a real-time basis from remote control centers 21–26 and the fire fighting resources 30, 40, as discussed above.

Based on the received image data and the selected fire control factors, the danger index matrix is calculated as indicated in block 227 of FIG. 20. Based on the results of the danger index calculation, the sector priority vectors are computed in block 228. The sector priority vectors define the highest priority sectors for the dispatching of fire fighters and fire fighting equipment as indicated in block 229 of FIG. 20. Although not shown in FIG. 20, the control processor 208 also tracks and monitors the precise location of all available fire fighting resources 30, 40, and automatically optimizes fire fighting decisions by evaluating the priority values in view of the known location of the fire fighting resources.

Using the fire fighting systems and methods disclosed above, an automated online expert system evaluation is implemented to assist fire fighters in their decision making process on a real-time basis, and to optimize fire fighting efforts. Real-time update of prioritization information based on the status of the fire and environmental conditions along with relative values of various areas in the path of the fire greatly assists fire fighters and decision makers during critical periods of fire fighting activities. Of course, ultimate dispatching decisions are made by fire fighting personnel who are able to evaluate multiple parameters and dangerous situations on a real-time basis and make appropriate fire fighting decision. The system herein above described provides yet another source of information to assist in making these decisions.

The inventions set forth above are subject to many modifications and changes without departing from the spirit, scope or essential characteristics thereof. Thus, the embodiments explained above should be considered in all respects as being illustrative rather than restrictive of the scope of the inventions, as defined in the appended claims.

What is claimed is:

1. An automated method for optimizing fire fighting decisions comprising the acts of:
   a. generating and storing in a computer database geographic control data characterizing preselected parameters of a plurality of geographic regions of the earth;
   b. controlling an imaging system to periodically acquire images of a selected geographic region;
   c. generating computer-readable image data defining characteristics of the acquired image of the selected geographic region, and storing the image data in an image memory;
   d. accessing the image data stored in the image memory and routing the data to a neural network image processing computer;
   e. computer analyzing the image data with the neural network image processing computer and determining whether a fire exists in the selected geographic region;
   f. further computer processing the image data of the selected geographic region and generating fire control data defining preselected characteristics of the fire;
   g. accessing the geographic control data stored in the database that defines the preselected parameters of the selected geographic region in which the fire is burning;
   h. routing the fire control data and the geographic control data to an expert system computer;
   i. executing an expert system program in the expert system computer that employs prestored expert rules and analyzing the fire control data and the geographic control data to determine optimum fire fighting actions; and
   j. indicating the optimum fire fighting actions determined by the expert system computer.

2. The method of claim 1 further comprising the acts of:
   a. employing a global positioning system to determine the geographic location of fire fighting resources available to fight a fire;
   b. generating geographic fire resource data defining the geographic location of the fire fighting resources; and
   c. communicating to the expert system computer the geographic fire resource data.

3. The method of claim 2 wherein the act of executing the expert system program in the expert system computer includes employing preprogrammed expert decision rules to analyze the geographic fire resource data.

4. The method of claim 2 further comprising the acts of:
   a. communicating the fire control data and the resource location data to a display processor; and
   b. operating the display processor to control a display to graphically indicate the location of the fire and the fire fighting resources.

5. The method of claim 1 further comprising the act of generating command data defining the optimum fire fighting actions determined by the expert system computer.

6. The method of claim 5 further comprising the act of communicating the command data to a speech synthesis computer and controlling the speech synthesis computer to generate audible sounds indicating the optimum fire fighting decisions.

7. The method of claim 6 further comprising the act of communicating the optimum fire fighting actions determined by the expert system computer to fire fighting resources.

8. The method of claim 1 wherein the act of determining optimum fire fighting actions includes applying preprogrammed expert system rules to analyzing geographic control data defining the combustibility of the selected geographic region.

9. The method of claim 1 wherein the act of determining optimum fire fighting actions includes applying preprogrammed expert system rules to analyzing geographic control data defining the terrain of the selected geographic region.

10. The method of claim 1 wherein the act of determining optimum fire fighting actions includes applying preprogrammed expert system rules to analyzing geographic control data defining the value of property in the selected geographic region.

11. The method of claim 1 wherein the act of determining optimum fire fighting actions includes applying preprogrammed expert system rules to analyzing geographic control data defining the population of the selected geographic region.

12. The method of claim 1 wherein the act of determining optimum fire fighting actions includes applying preprogrammed expert system rules to analyzing geographic control data defining the weather in the selected geographic region.

13. The method of claim 2 further comprising the act of controlling at least one weather station to periodically update and communicate to the computer database data defining the current weather in the selected geographic region.

14. The method of claim 1 further comprising repeating the acts specified in clauses (b) through (j) as a fire bums.

15. The method of claim 5 further comprising the acts of updating optimum fire fighting decisions in response to new fire control data and new resource location data.

16. The method of claim 1 wherein executing an expert system program in the expert system computer to determine optimum fire fighting action includes deriving relative danger values for portions of the selected geographic region.

* * * * *